(12) United States Patent
Yoshida et al.

(10) Patent No.: US 7,091,711 B2
(45) Date of Patent: *Aug. 15, 2006

(54) SWITCHING POWER SUPPLY DEVICE AND SWITCHING POWER SUPPLY SYSTEM

(75) Inventors: Shinichi Yoshida, Takasaki (JP); Tomohiro Tazawa, Maebashi (JP); Takashi Sase, Hitachi (JP); Kouji Tateno, Hitachi (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/304,903

(22) Filed: Dec. 16, 2005

(65) Prior Publication Data

US 2006/0091870 A1 May 4, 2006

Related U.S. Application Data

(63) Continuation of application No. 10/452,051, filed on Jun. 3, 2003, now Pat. No. 6,979,985.

(30) Foreign Application Priority Data

Jun. 7, 2002 (JP) ............................. 2002-167579
May 26, 2003 (JP) ............................. 2003-147151

(51) Int. Cl.
*G05F 1/40* (2006.01)
(52) U.S. Cl. ...................................... 323/282
(58) Field of Classification Search ................ 323/282, 323/283, 284, 285, 351
See application file for complete search history.

(56) References Cited

U.S. PATENT DOCUMENTS

| | | | |
|---|---|---|---|
| 4,929,882 A | 5/1990 | Szepesi | 323/222 |
| 5,481,178 A | 1/1996 | Wilcox et al. | 323/287 |
| 5,731,694 A | 3/1998 | Wilcox et al. | 323/287 |
| 5,731,731 A | 3/1998 | Wilcox et al. | 327/403 |
| 5,770,940 A | 6/1998 | Goder | 323/282 |
| 5,825,165 A | 10/1998 | Kitching et al. | 323/282 |
| 5,877,611 A | 3/1999 | Brkovic | 323/222 |
| 5,982,160 A | 11/1999 | Walters et al. | 323/282 |
| 5,994,885 A | 11/1999 | Wilcox et al. | 323/285 |
| 6,147,478 A | 11/2000 | Skelton et al. | 323/288 |
| 6,304,066 B1 | 10/2001 | Wilcox et al. | 323/282 |
| 6,348,780 B1 | 2/2002 | Grant | 323/222 |
| 6,366,066 B1 | 4/2002 | Wilcox | 323/282 |
| 6,424,129 B1 | 7/2002 | Lethellier | 323/272 |
| 6,441,597 B1 | 8/2002 | Lethellier | 323/282 |
| 6,518,738 B1 | 2/2003 | Wang | 323/284 |
| 6,580,258 B1 | 6/2003 | Wilcox et al. | 323/282 |

(Continued)

OTHER PUBLICATIONS

George, Mark et al., "Universal Current Sharing Issues for VRMs", *IBM 2000 Power Technology Symposium*, Sep. 14, 2000, pp. 1-15.

*Primary Examiner*—Adolf Berhane
(74) *Attorney, Agent, or Firm*—Miles & Stockbridge P.C.

(57) ABSTRACT

There is provided a switching power supply device of hysteresis current mode control system which assures excellent response characteristic for change of output current and reduction of power consumption. In a switching regulator of hysteresis current mode control system, a sense resistor connected in series to a coil is eliminated, a serially connected resistor and a capacitor are connected in parallel to a coil in place of such sense resistor. Thereby, a potential of a connection node of these resistor and capacitor is inputted to a comparator circuit having the hysteresis characteristic for comparison with the reference voltage. Accordingly, a switch may be controlled for ON and OFF states.

12 Claims, 26 Drawing Sheets

U.S. PATENT DOCUMENTS 6,674,274 B1    1/2004   Hobrecht et al. ........... 323/285

6,979,985 B1 *  12/2005  Yoshida et al. ............. 323/282

* cited by examiner

CR FEEDBACK/HYSTERESIS CIRCUIT

IMPROVED CR FEEDBACK/HYSTERESIS CONTROL CIRCUIT

OUTPUT VOLTAGE WAVEFORMS WHEN DROOP CONTROL IS ON AND OFF (a) DROOP CONTROL IS ON (b) DROOP CONTROL IS OFF

ALLOWABLE RANGE OF OUTPUT VOLTAGE

APPLICATION INTO A NON-INSULATED VOLTAGE STEP-UP TYPE

WHEN CAPACITOR IS NOT INSERTED AND WHEN ONE OR MORE CAPACITORS ARE INSERTED

APPLICATION INTO A NON-INSULATED VOLTAGE STEP-DOWN TYPE

WHEN CAPACITOR IS NOT INSERTED AND WHEN ONE OR MORE CAPACITORS ARE INSERTED

APPLICATION INTO AN INSULATED VOLTAGE STEP-DOWN TYPE

FIG. 5G

BASIC CIRCUIT CONFIGURATION FOR CURRENT DETECTION
USING CR FEEDBACK CONTROL DETECTION UNIT (a) BASIC CIRCUIT CONFIGURATION FOR COIL CURRENT DETECTION

WHEN CAPACITOR IS NOT INSERTED AND WHEN ONE OR MORE CAPACITORS ARE INSERTED

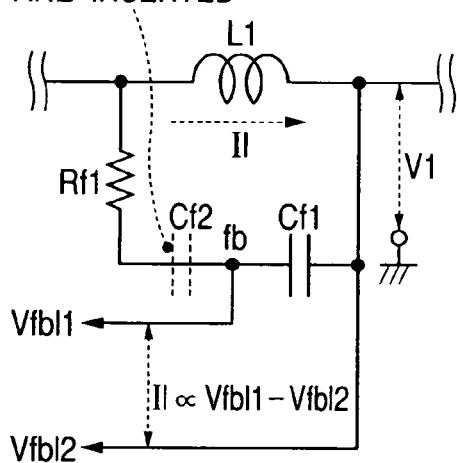

(b) BASIC CIRCUIT CONFIGURATION FOR DIODE CURRENT DETECTION

WHEN CAPACITOR IS NOT INSERTED AND WHEN ONE OR MORE CAPACITORS ARE INSERTED

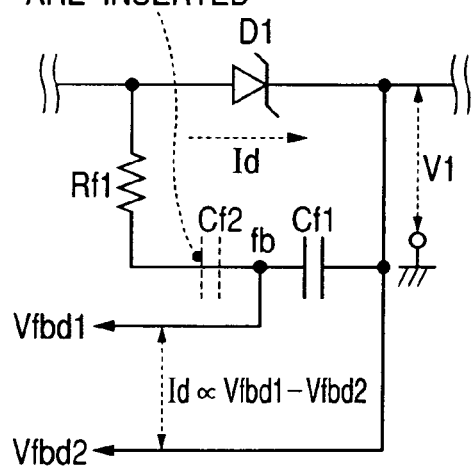

(c) BASIC CIRCUIT CONFIGURATION FOR SWITCH CURRENT DETECTION

WHEN CAPACITOR IS NOT INSERTED AND WHEN ONE OR MORE CAPACITORS ARE INSERTED

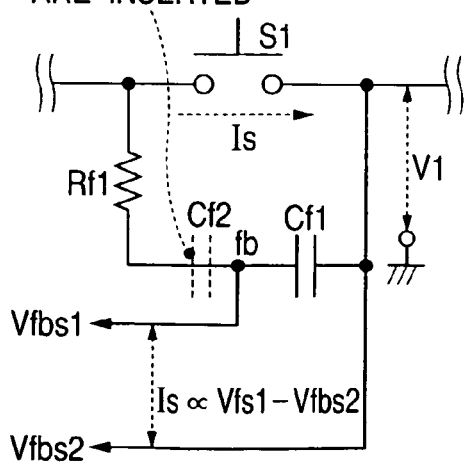

(d) BASIC CIRCUIT CONFIGURATION FOR TRANSFORMER CURRENT DETECTION

WHEN CAPACITOR IS NOT INSERTED AND WHEN ONE OR MORE CAPACITORS ARE INSERTED

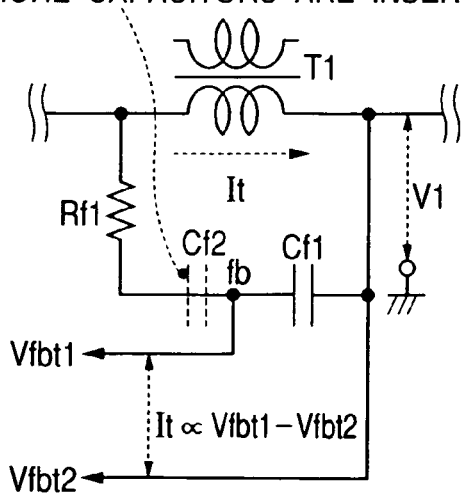

SWITCHING POWER SUPPLY DEVICE AND SWITCHING POWER SUPPLY SYSTEM

CROSS-REFERENCE TO RELATED APPLICATION

This application is a continuation of application Ser. No. 10/452,051 filed Jun. 3, 2003 now U.S. Pat. No. 6,979,985.

BACKGROUND OF THE INVENTION

The present invention relates to the technology which may be effectively applied to a power supply device to generate a DC voltage and moreover to a switching regulator which is required to have the excellent transient response characteristic for change of output current, for example, to the technology which may be effectively applied to a power supply device to be mounted to a system which results in large variation of current dissipation.

In recent years, a microprocessor is often mounted as a system control device into an electronic device. Moreover, an operation frequency of the microprocessor (hereinafter, referred to as CPU) tends to be more and more increased and the maximum operation current also increases depending on increase in the operation frequency. For a portable electronic device or the like comprising a built-in CPU, a system is often employed, in which a battery voltage is stepped up or down with a switching regulator to supply the operation current to the CPU, but since the battery is very much consumed in this system, when operation of the CPU is not required, the entire circuit of the CPU or the partial circuit thereof is stopped to operate. Therefore, changing range of current dissipation of the CPU tends to increase with increase of the maximum operation current of the CPU. Therefore, as a power supply device to supply the operation current to the CPU, those having excellent transient response characteristic for change of output current have been required.

As a switching regulator having excellent transient response characteristic, the regulator called the hysteresis current mode control system regulator is known (for example, U.S. Pat. No. 5,825,165).

The proposed switching regulator of the hysteresis current control system comprises a current sense resistor connected in series to a coil for detecting current flowing through the coil and an error amplifier for outputting a current proportional to an error voltage between the voltage (feedback voltage) obtained by dividing an output voltage with a resistance dividing circuit and the reference voltage. The switching regulator of the structure described above compares an error voltage expressed with product of a value of the resistor connected between a connecting node of the coil and sense resistor and an output terminal of the error amplifier and an output current of the error amplifier with an output voltage with a comparator having the hysteresis characteristic and switches a main switch, which supplies a current to the coil when a voltage-drop at the sense resistor exceeds "error voltage+hystereris voltage", to OFF from ON and also switches a synchronous switch, which operates to reduce a current to the coil synchronously with the main switch, to ON from OFF. Moreover, this switching regulator switches the main switch to ON from OFF when the voltage-drop at the sense resistor becomes lower than the error voltage, and also controls the output voltage to the constant value by turning the synchronous switch to OFF from ON.

Such switching regulator of the hysteresis current mode control system is capable of maintaining the output voltage to the constant value through quick response against change of the output current by elongating the ON period of the main switch when the output current increases and shortening the ON period of the main switch when the output current decreases, in order to provide the feedback effect to elongate the ON period of the synchronous switch.

SUMMARY OF THE INVENTION

However, the conventional switching regulator of the hysteresis current mode control system has following problems.

First, since a sense resistor is connected in series with a coil, a large amount of electrical power is consumed in a sense resistor. Moreover, since this power consumption increases as the maximum operation current of CPU becomes larger, it causes further drop of power efficiency. Here, it is thought to make small the value of sense resistor in view of lowering such power loss. However, when the value of sense resistor is lowered too much, since a monitor voltage can no longer exceed the hysteresis voltage of a comparator, the switching frequency does not become stable, resulting in the disadvantage that a ripple of output voltage increases.

Second, since an output of error amplifier has to follow the change of output current, the response characteristic for variation of output current is delayed as much as existence of the error amplifier. Moreover, in general, since a phase compensation circuit is required to prevent oscillation of error amplifier, the physical structure of circuit becomes large as much as provision of the phase compensation circuit.

Third, when a resistance value of the sense resistor is defined as Rcs, the switching frequency fsw of the regulator is expressed as follows.

$$fsw = Vout(Vin-Vout) * Rcs/Vin \cdot Vhys \cdot L \qquad (a)$$

From the formula (a), it can be understood that the switching frequency fsw depends on coil inductance L. Therefore, the switching frequency changes depending on fabrication fluctuation of coil, temperature change and DC current superimposing characteristic, resulting in the fear for generation of beat noise in the audible frequency band depending on the electro-magnetic interference in an electronic device having the communication function and audio reproducing function. Here, the DC current superimposing characteristic means the phenomenon that coil inductance changes depending on a DC current flowing into the coil.

Fourth, when a coil current IL is rather small, an output current Ierr of an error amplifier cannot be neglected and therefore, the switching frequency changes because the condition (IL−Ierr)·Rcs≈ILRcs for giving the formula (a) can no longer be set up and moreover the switching frequency becomes unstable because the monitoring voltage does not exceed the hysteresis voltage of comparator, resulting in the problem that a ripple of the output voltage becomes large.

An object of the present invention is to provide a switching power supply device of the hysteresis current mode control system providing less power consumption.

Another object of the present invention is to provide a switching power supply device of the hysteresis current mode control system which assures excellent response characteristic for change of output current and can provide small physical structure of circuit because a phase compensation circuit for preventing oscillation is no longer required.

The other object of the present invention is to provide a switching power supply device of the hysteresis current mode control system in which the switching frequency does not depend on coil inductance, namely is not easily influenced by fabrication fluctuation.

Further object of the present invention is to provide a switching power supply device of the hysteresis current mode control system in which the switching frequency does not depend on amplitude of coil current, namely the stable operation is assured even when a coil current is rather small.

The aforementioned and the other objects and novel features of the present invention will become apparent from the description of this specification and the accompanying drawings thereof.

The typical inventions of the present invention will be briefly described below.

Namely, the switching regulator of the hysteresis current mode control system has the structure that a means for detecting change of output voltage is provided in place of the sense resistor which is connected in series with the coil to detect change of output current, the detected voltage is inputted to the comparing circuit having the hysteresis characteristic for comparison with the reference voltage, and this comparison circuit generates a feedback signal to the switching control circuit to control ON and OFF conditions of the main switch and synchronous switch. As a means for detecting change of output voltage, the serially connected resistor and capacitor which are connected in parallel to the coil are used and a potential of the connection node of these resistor and capacitor is inputted to the comparing circuit.

According to the means described above, since the sense resistor, which is connected in series with the coil and is given the current flowing into the coil, is eliminated, power consumption may be reduced. Moreover, since the error amplifier is also eliminated, the response characteristic for changes of input voltage and output voltage may be improved and since the phase compensation circuit is no longer required, the physical size of circuit may be as much reduced. In addition, the switching frequency does not depend on fabrication fluctuation of coil inductance, temperature change and amplitude of coil current or the like and thereby a ripple of output voltage can also be reduced.

BRIEF DESCRIPTION OF THE DRAWINGS

FIGS. 5G (*a*),(*b*),(*c*), and (*d*) are the circuit diagrams of a case of the operation as the basic composition of the current detection circuit using CR feedback hysteresis control detection part to which the present invention is applied, respectively.

DETAILED DESCRIPTION OF THE PREFERRED EMBODIMENTS

The preferred embodiments of the present invention will be described below in detail with reference to the accompanying drawings.

Figure 1:
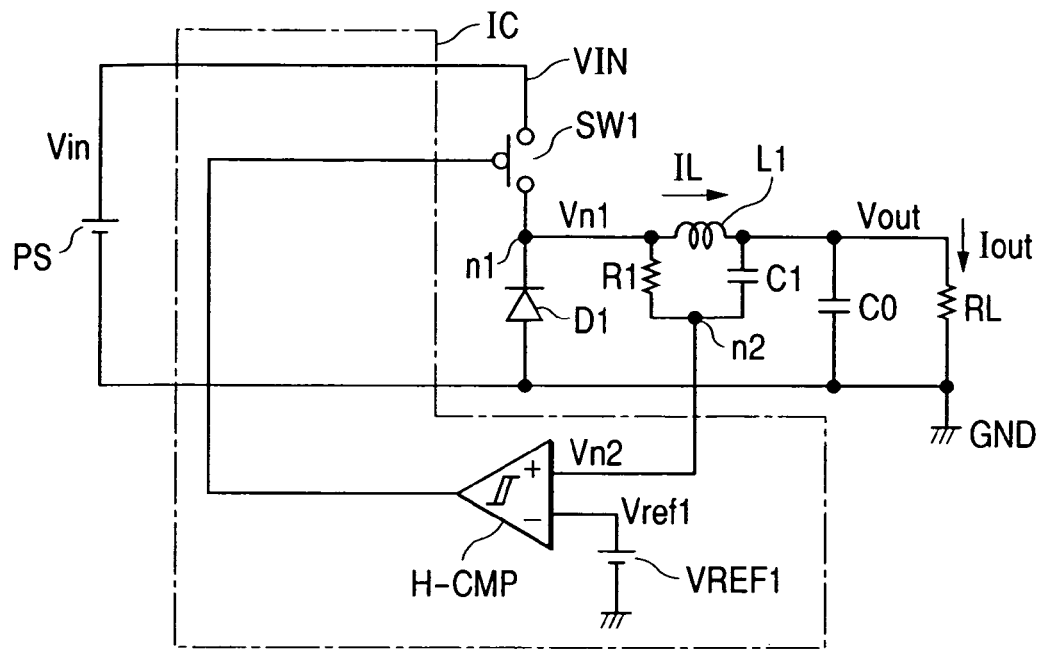
FIG. 1 is a structural diagram of circuit illustrating the first embodiment of voltage step-down type switching regulator of the hysteresis current mode control system to which the present invention is applied.

FIG. 1 illustrates an embodiment of a voltage step-down type switching regulator of the hysteresis current mode control system to which the present invention is applied.

The switching regulator of this embodiment comprises a switch SW1 consisting of MOSFET and a diode D1 connected in series between a voltage input terminal VIN to which a DC voltage Vin supplied from the DC power supply PS such as a battery is inputted and the ground point (GND), a coil L1 as the inductor connected between the intermediate node n1 of the switch SW1 and diode D1 and an output terminal VOUT, a smoothing capacitor C0 connected between the output terminal VOUT and the ground point, serially connected resistor R1 and capacitor C1 connected in parallel to the coil L1, and a hysteresis comparator H-CMP for comparing the potential Vn2 of the connection node n2 of the resistor R1 and capacitor C1 and the reference voltage Vref1 from the reference voltage source VREF1. Thereby, this switching regulator is formed to control ON and OFF the switch SW1 by impressing an output of the comparator H-CMP to the gate of this switch.

In FIG. 1, a semiconductor integrated circuit as a load such as CPU which is operated by receiving a voltage from the switching regulator of this embodiment is illustrated as resistor RL. When the switch SW1 is controlled to ON and OFF, a current is outputted from the coil L1 depending on the duty ratio of the ON/OFF control pulse. Here, the hysteresis comparator H-CMP shows a lower threshold value when the voltage inputted to the non-inverted input terminal is higher than the reference voltage impressed to the inverted input terminal and shows a threshold value which is increased by the predetermined potential when the voltage inputted to the non-inverted input terminal is lower than the reference voltage inputted to the inverted input terminal. Since the comparator circuit having such characteristic is already known, illustration and description of the practical circuit will be omitted here, but it is desirable here that the comparator uses the circuit formed of a MOSFET having a higher input impedance.

In FIG. 1, the part enclosed by the chain-line is configured as a semiconductor integrated circuit on a semiconductor chip such as a single crystal silicon. Namely, the coil L1, capacitor C1, resistor R1, switch SW1 and diode D1 are connected as the external elements. Thereby, a highly accurate regulator may be realized.

Figure 2:
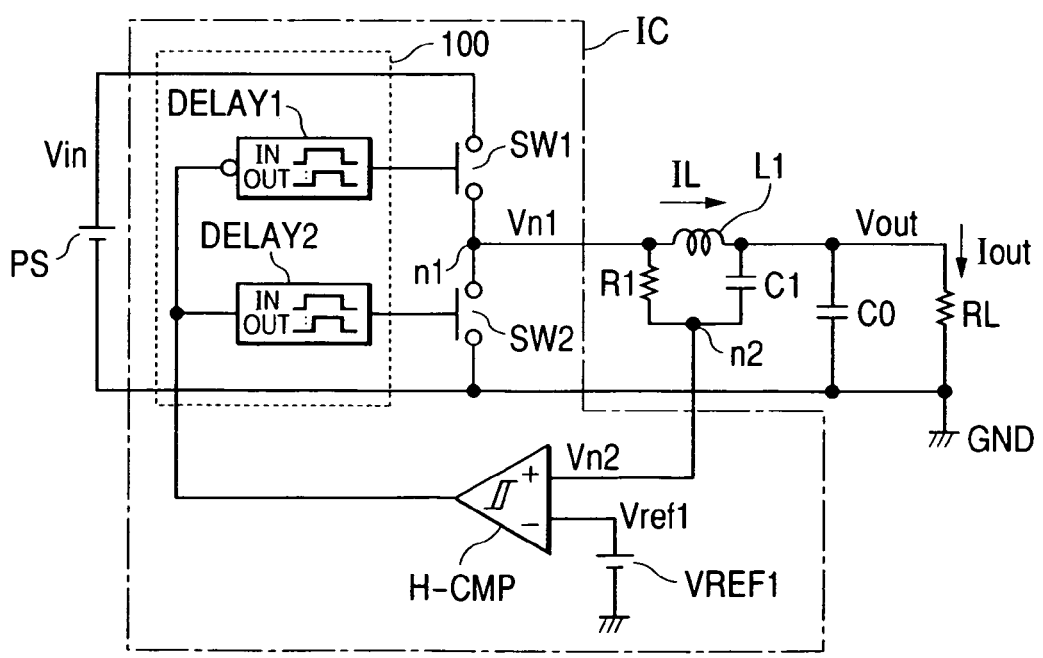
FIG. 2 is a structural diagram of circuit illustrating the second embodiment of the voltage step-down type switching regulator of the hystereris current mode control system to which the present invention is applied.

However, this part is never limited only to the structure described above and it may use, in place of the diode D1, the switch SW2 which complementarily turns ON and OFF against the switch SW1, as in the case of the second embodiment of the switching regulator of the present invention illustrated in FIG. 2.

But, in this case, it is required to provide the dead band using the delay circuits DELAY1, DELAY2 or the like in the switching control circuit 100 in order to prevent that the switches SW1 and SW2 simultaneously turn ON and a heavier current flows through the voltage input terminal VIN and the ground point GND.

Figure 15A:
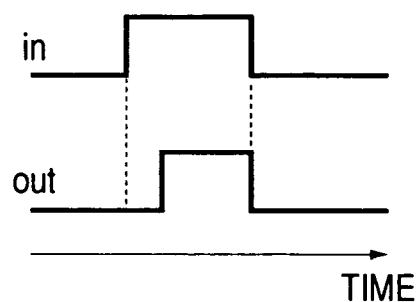
FIGS. 15A and 15B respectively illustrate the internal circuit and input/output relationship of the Delay 1 circuit and Delay 2 circuit.
Figure 15B:
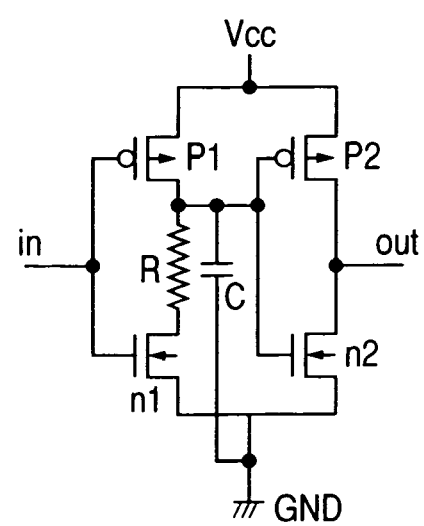

In the case where a through-current does not flow because the switches SW1 and SW2 are operated complementarily, the switching control circuit is configured, although not particularly restricted, as designated as 100 in FIG. 2. The delay circuit thereof has the input/output relationship as illustrated in FIG. 15A. Accordingly, an output is delayed for the incoming L→H input but this output is not delayed for the incoming H→L input. The practical delay circuit is configured as illustrated in FIG. 15B. When the H level input is inputted to the terminal in, the PMOSp1 turns OFF and the NMOSn1 turns ON. Therefore, a current is drawn to the GND terminal. In this case, since the charges accumulated in the parasitic capacitor of the NMOSn2 and PMOSp2 are drawn via the conductive path including the capacitor C connected to the conductive path and GND terminal and the resistor R, transition of H level at the terminal out is delayed due to the delay time based on the time constant determined by the capacitor C and resistor R. On the other hand, when the L-level input is inputted to the terminal in, such phenomenon does not occur because a current does not flow via the resistor R.

Here, it is also possible that the switches SW1, SW2 (or diode D1) are provided within the IC chip or the capacitor C1 and resistor R1 provided in parallel to the coil L1 may be provided within the IC chip, and thereby the number of components of the power supply device may be reduced to realize reduction in size by providing these elements into the IC chip. It is also desirable for the switches SW1, SW2 (or diode D1) that these are formed of external elements in the power supply device used for the system which requires the high level output current because it is required to supply a comparatively high level current, but the elements formed on the chip may be used in the power supply device used for the system which requires the low level output current.

Next, the practical operations of the switching regulator of the second embodiment will be described using the timing charts of FIG. 3A to FIG. 3E.

The switching regulator of the embodiment inverts an output of the hysteresis comparator H-CMP when the potential Vn2 of the connection node n2 of the resistor R1 and capacitor C1 becomes lower than the reference voltage Vref being inputted to above comparator. Thereby, the switch SW1 which supplies a current to the coil L1 is switched to ON from OFF with the switching control circuit 100 and the switch SW2 which operates to reduce the current supplied to the coil L1 is synchronously switched to OFF from ON. Accordingly, the current flows into the coil L1 from the power supply terminal Vin via the switch SW1. In this timing, the capacitor C1 is charged via the resistor R1 and the potential Vn2 of the connection node n2 gradually rises.

Moreover, the hysteresis comparator H-CMP inverts its output when the potential Vn2 of the connection node n2 becomes higher than Vref+Vhys under the condition that the hysteresis voltage of comparator is defined as Vhys. Accordingly, the switch SW1 is turned OFF from ON with the switching control circuit 100 and the switch SW2 is synchronously turned ON from OFF, respectively. Thereby, the current flowing into the coil L1 is reduced with the switch SW2. In this case, the capacitor C1 is discharged via the resistor R1 and the potential Vn2 of the connection node n2 drops gradually.

Figure 3A:
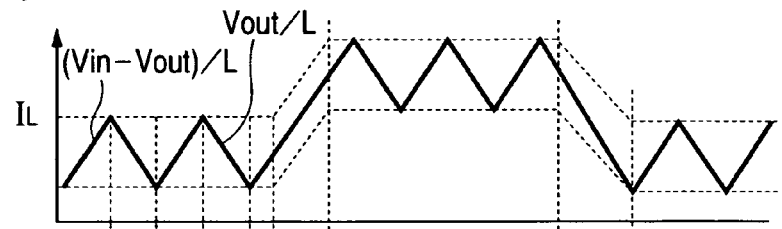
FIGS. 3A to 3E are timing charts illustrating changes of coil current and output current in the switching regulator of the second embodiment and also illustrating the ON and OFF timings of the main switch and synchronous switch.

The current IL flowing into the coil L1 changes in the shape of a triangular wave as illustrated in FIG. 3A by repeating the operations described above. Respective changes with time during the periods where the coil current IL increases and decreases is (Vin−Vout)/L in the increasing period and Vout/L in the decreasing period when an inductance of coil L1 is defined as L. Meanwhile, when the resistance value of resistor R1 is defined as R, the current Ic which flows to charge and discharge the capacitor C1 is (Vin−Vout)/R in the increasing period and Vout/R in the decreasing period. Therefore, the resistor R1 is used to linearly transfer change of current IL to the node n2.

Accordingly, an almost stable current IL is supplied to the coil L1 under the steady condition (during the periods of T1, T3, T5 of FIG. 3C) where the output current Iout is constant. In this case, when a duty ratio ton/(ton+toff) of the signal to control ON and OFF the switch SW1 is defined as N, the output voltage Vout of the regulator is expressed as Vout=N·Vin. Here, the ton indicates the ON period of switch, while toff indicates the OFF period of switch. When the switches SW1 and SW2 are to be changed over, these switches are controlled to avoid that these two switches are turned ON simultaneously and the through-current flows by providing the predetermined dead band as illustrated in FIG. 3D and FIG. 3E.

Figure 3B:
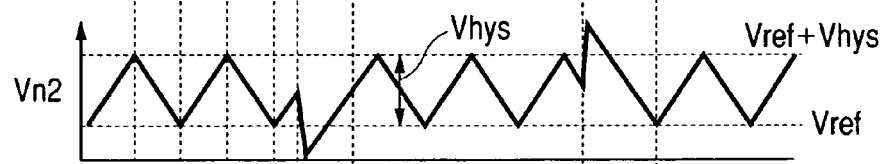
Figure 3C:
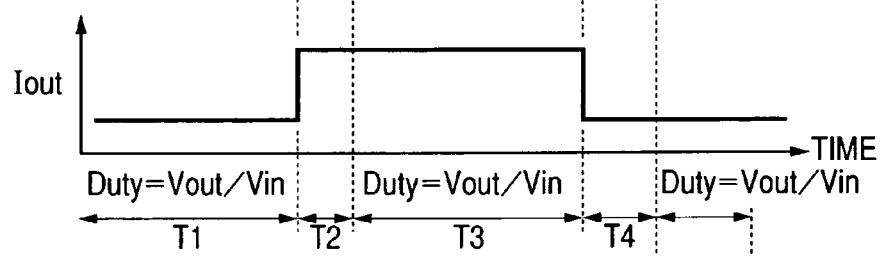
Figure 3D:
Figure 3E:
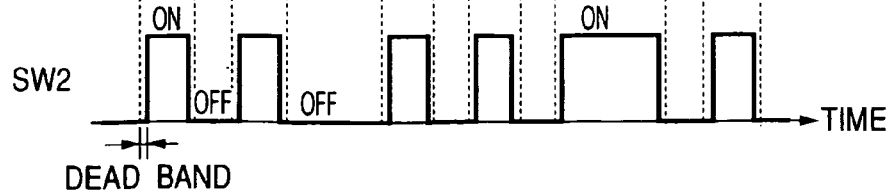

In the transition state (T2) where the output current Iout increases, potential change is transferred to the connection node n2 via the capacitor C1 depending on sudden drop of the output voltage Vout and when such potential Vn2 is rapidly decreased as illustrated in FIG. 3B, the period (OFF period of SW2) to turn ON the switch SW1 is extended as illustrated in FIG. 3D. Moreover, in the transition state (T4) where the output current Iout decreases, since the potential Vn2 of the connection node n2 rises depending on the sudden drop of the output voltage Vout, the period to turn OFF the switch SW1 is extended as illustrated in FIG. 3D.

Although not illustrated in FIG. 3A to FIG. 3E, when the transition state (T2) starts where the output current Iout increases while the coil current IL decreases, the period (ON period of SW2) to turn OFF the switch SW1 is shortened. Moreover, in the transition state (T4) where the output current Iout decreases while the coil current IL increases, the period to turn ON the switch SW1 is extended.

The conventional switching regulator of the hysteresis current mode control system feeds back change of output voltage to the hysteresis comparator via an error amplifier. However, in this embodiment, since change of output voltage is immediately transferred to the hysteresis comparator H-CMP via the capacitor C1, the response characteristic for change of output current Iout can be improved. In addition, since change of output is transferred to the comparator H-CMP having a higher input impedance via the capacitor C1, influence on the output voltage may also be reduced. Moreover, change of input voltage Vin is also transferred to the connection node n2 via the resistor R1 and it is then fed back to the hysteresis comparator. Accordingly, response of regulator for change of input voltage can also be improved.

The switching frequency fsw of the switching regulator of this embodiment is expressed by the following formula.

$$fsw = Vout(Vin-Vout)/Vin \cdot Vhys \cdot r1 \cdot C1 \quad \text{(b)}$$

From this formula, it is apparent that the switching frequency fsw of the regulator of this embodiment depends on the value of the resistor R1 and capacitor C1, but not on the inductance of coil L1. The resistance element having small fabrication fluctuation in comparison with the coil may be obtained easily and moreover the capacitance element having the fabrication fluctuation which is similar to that of coil but the temperature characteristic which is smaller than that of coil may also be obtained easily. In addition, since there is no item of the inductance value of coil within the formula (b) indicating the switching frequency, it is no longer required to consider the particular problem of coil, namely the DC current superimposing characteristic in which the inductance value changes depending on the flowing current. Accordingly, variation of the switching frequency fsw can be reduced in comparison with the conventional switching regulator of the hysteresis current mode control system.

Moreover, the sense resistor which is connected in series to the coil is no longer required in the switching regulator of this embodiment. Even in this embodiment, the resistor is used but it is connected in series to the capacitor and there is no path for DC current. Therefore, power consumption can be reduced more than the conventional switching regulator of the hysteresis current mode control system. In addition, since the error amplifier is unnecessary, the response characteristic can be improved and it is no longer required to provide a phase compensation circuit. Accordingly, the scale of circuit can be as much reduced.

Figure 4A:
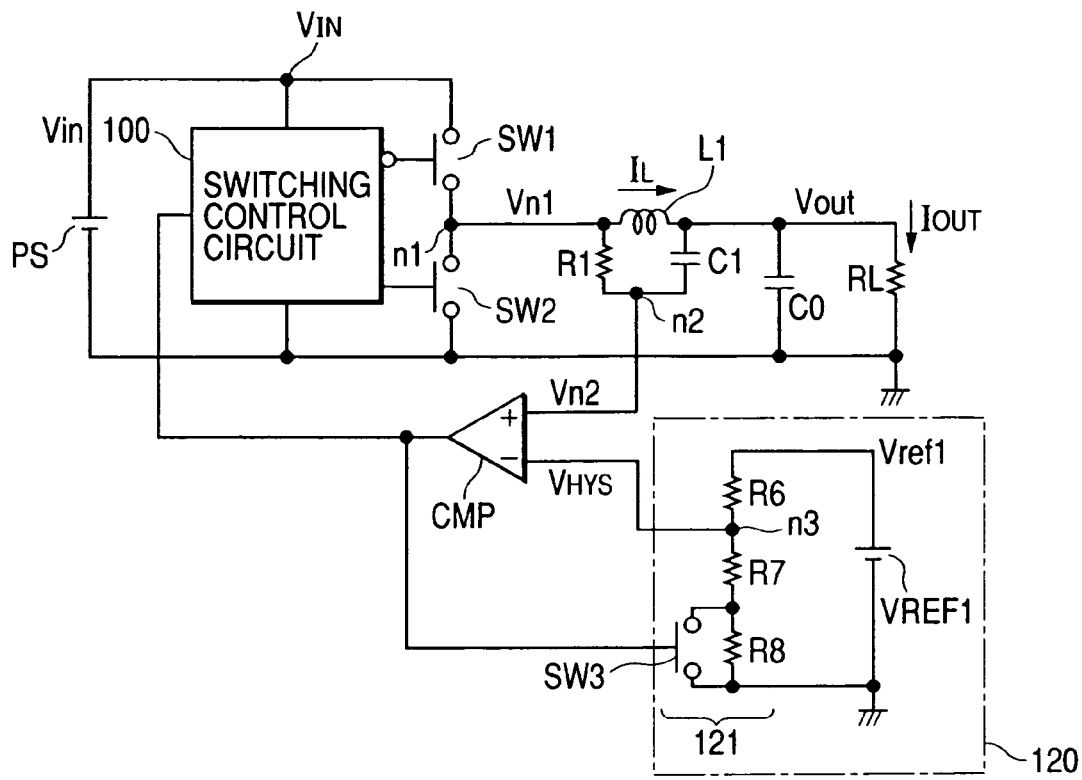
FIG. 4A is a structural diagram of circuit illustrating the third embodiment of the voltage step-down type switching regulator of the hysteresis current mode control system to which the present invention is applied.

FIG. 4A illustrates the third embodiment of the switching regulator of the present invention.

This embodiment uses an ordinary comparator CMP through replacement of the comparator H-CMP having the hysteresis characteristic used in the second embodiment, and switches the reference voltage VHYS to be inputted to this comparator. In more practical, the switching regular of this embodiment is provided with a reference voltage source VREF1 and a reference voltage generating circuit 120 consisting of the serial resistors R6, R7, R8 for dividing the reference voltage Vref1 generated by the reference voltage source VREF1 and a resistance dividing circuit 121 consisting of the switch SW3 provided in parallel with the resistor R8. In this structure, the potential of the connection node n3 of the resistor R6 and resistor R7 is impressed to the inverted input terminal of the comparator CMP as the reference voltage VHYS and the comparator CMP seems to have virtual hysteresis characteristic by changing the reference voltage VHYS through the switching operation of the switch SW3 with an output of the comparator CMP.

Figure 4B:
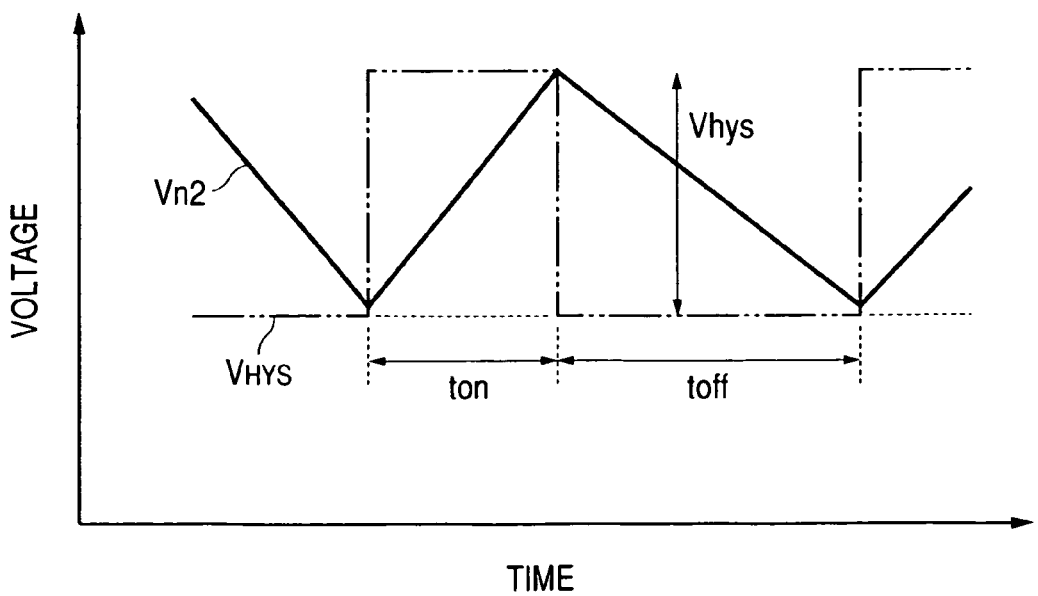
FIG. 4B is a timing chart illustrating change of voltage inputted to the comparator of switching regulator of the third embodiment.

FIG. 4B illustrates the relationship between the reference voltage VHYS applied to the inverted input terminal of the comparator CMP and the potential Vn2 of the node n2. The circuit of FIG. 4A operates to turn ON the switch SW3 to lower the reference voltage VHYS when the potential Vn2 of node n2 is higher than the reference voltage VHYS and to turn OFF the switch SW3 to raise the reference voltage VHYS when the potential Vn2 of node n2 is lower than the reference voltage VHYS.

In this embodiment, the regulator may be operated in the same manner as the regulators of the first and second embodiments when it is designed so that the voltage difference between the voltage obtained by turning ON the switch SW3 and dividing the reference voltage Vref1 with a ratio of the resistors R6 and R7 and the voltage obtained by turning OFF the switch SW3 and dividing the reference voltage Vref1 with the ratio R6/(R7+R8) of resistor T6 to the sum of the resistors R7 and R8 becomes equal to the hysteresis voltage Vhys of the comparator H-CMP in the first and second embodiments. In this embodiment, the switch SW3 is controlled with an output of the comparator CMP to switch the reference voltage VHYS. However, the similar operation can also be attained by providing an inverter to invert the potential of the connection node n1 of the switches SW1 and SW2 in order to turn ON and OFF the switch SW3 with an output of this inverter.

Figure 4C:
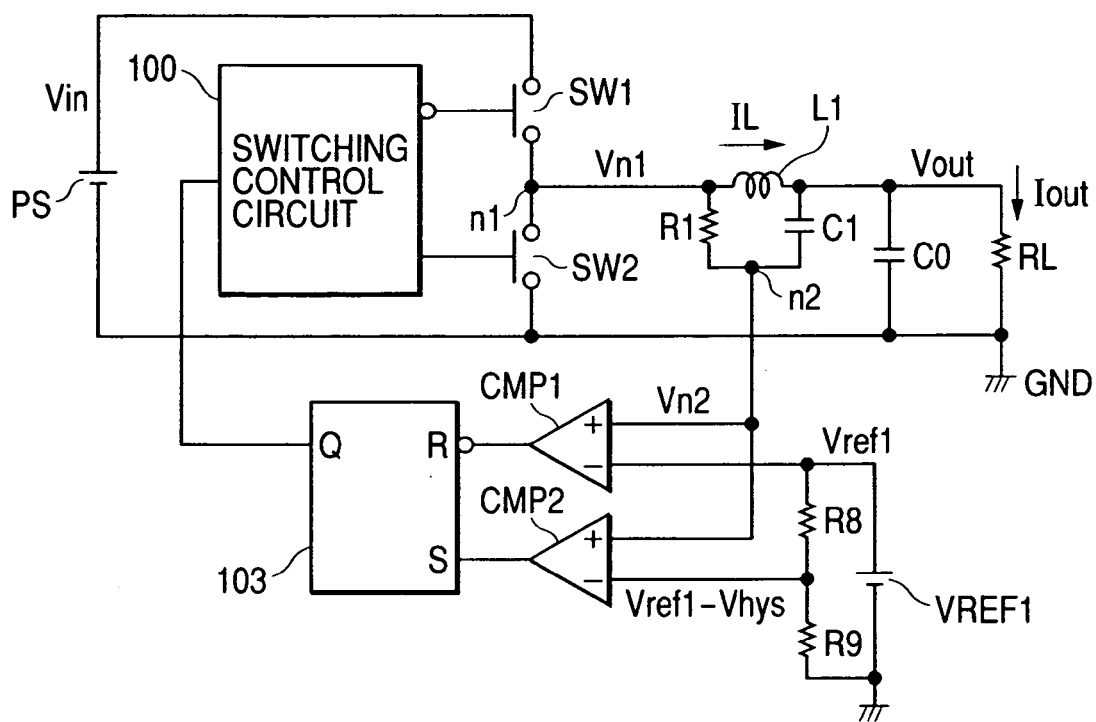
FIG. 4C is a structural diagram of circuit illustrating the fourth embodiment of the voltage step-down type switching regulator of the hysteresis current mode control system to which the present invention is applied.

FIG. 4C illustrates the fourth embodiment of the switching regulator of the present invention.

This embodiment realizes the switching regulator of the type having the hysteresis characteristic by using two ordinary comparators. In more practical, the hysteresis characteristic can be attained by inputting the potential of node n2 to the non-inverted input terminals of the comparators CMP1, 2, inputting the reference voltage Vref1 generated by the reference power source VREF1 to the non-inverted input terminal of the comparator CMP1, inputting the voltage Vref1−Vhys divided from the reference voltage Vref1 with the series resistors R8, R9 to the non-inverted input terminal of the comparator CMP2, inputting the voltage obtained by inverting an output of the comparator CMP1 to the reset terminal of the RS flip-flop circuit 103 and inputting an output of the comparator CMP2 to the set terminal of the RS flip-flop circuit 103. In this embodiment, hen the potential of the node n2 becomes higher than the voltage Vref1, the switch SW1 turns OFF from ON and the switch SW2 is synchronously switched to ON from OFF. Moreover, when the voltage generated across the resistor R8 becomes the hysteresis voltage Vhys and the potential Vn2 of the connection node n2 becomes lower than Vref−Vhys, the respective switches are inverted. Thereby this switching regulator of the present invention may be operated like the regulators of the first, second and third embodiments.

Figure 5A:
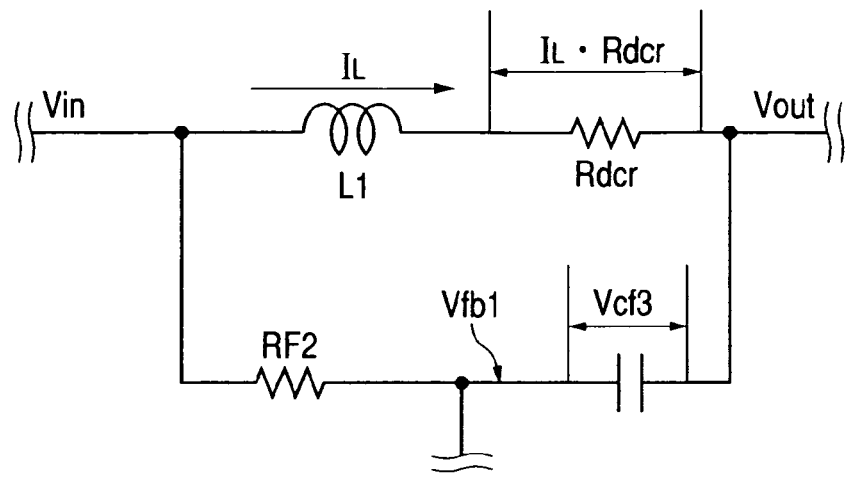
FIG. 5A is the circuit composition figure of one certain case of the operation showing the CR feedback hysteresis control circuit to which the present invention is applied.

FIG. 5A is the circuit composition figure of one certain case of the operation showing the CR feedback hysteresis control circuit. A voltage proportional to the current $(I_L)$ flowing into the coil (L1) is detected by connecting in parallel a CR series circuit across the coil. However, as illustrated in FIGS. 3A to 3E. a parasitic resistor (Rdcr) exits in the coil and voltage drop $(I_L \cdot Rdcr)$ generated by this parasitic resistor is also detected as a feedback signal. With increase of current required by the LSI, voltage drop due to the parasitic resistor also tends to increase proportionally. In the conventional CR feedback hysteresis control circuit, the feedback voltage (Vfb1) is expressed by the formula (1).

$$Vfb1 = Vout + Vcf_3 \qquad \text{formula (1)}$$
$$= Vout + Rdcr\left(\frac{1 + s \cdot (L/Rdcr)}{1 + s \cdot RF2 \cdot CF3}\right)I_L$$
$$= Vout + Rdcr\left(\frac{1 + s \cdot T}{1 + s \cdot T_1}\right)I_L$$

Here, T=L1/Rdcr, $T_1$=RF2·CF3, s=jω, ω=2πfsw1 (fsw1: switching frequency)

$$\frac{L1}{Rdcr} < RF2 \cdot CF3 \Leftrightarrow T < T_1 \qquad \text{formula (2)}$$

In order to reduce voltage drop due to the parasitic resistor of coil, it is required to satisfy the formula (2).

However, since the switching frequency (fsw1) of the conventional CR feedback hysteresis control circuit is expressed by the formula (3), $$fsw1 = \frac{Vout \cdot (Vin - Vout)}{Vin \cdot Vhys \cdot RF2 \cdot CF3} = \frac{Vout \cdot (Vin - Vout)}{Vin \cdot Vhys \cdot T_1} \qquad \text{formula (3)}$$

the switching frequency is also reduced when it is attempted to reduce the voltage drop due to the parasitic resistor of coil from the feedback signal. Since the power supply devices tend to be scattered near each LSI for reducing the power supply voltage of LSI, increasing the current dissipation and reduction in size of the power supply device and increasing di/dt, reduction in size of the power supply device is required. For such reduction in size of the power supply device, the drive frequency must be increased and therefore reduction of drive frequency to reduce the influence of voltage drop by the parasitic resistance of coil from the feedback signal will result in various problems.

Figure 5B:
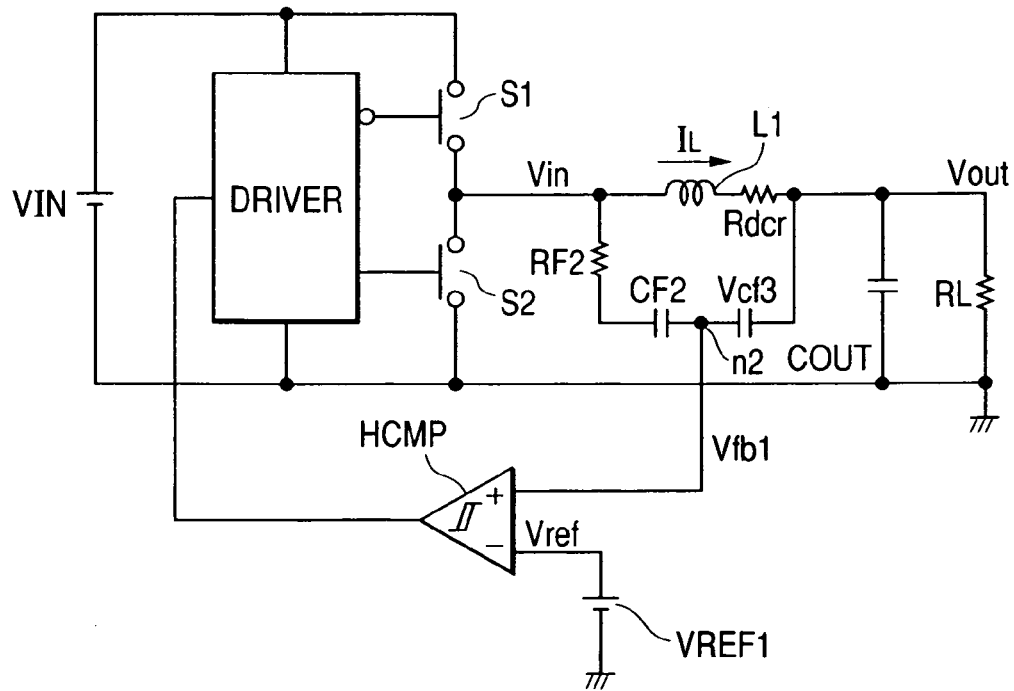
FIG. 5B is the circuit composition figure of one certain case of the operation showing the circuit which improved CR feedback hysteresis control circuit of FIG. 5A to which the present invention is applied.

FIG. 5B is the circuit composition figure of one certain case of the operation showing the circuit which improved CR feedback hysteresis control circuit of FIG. 5A. This CR feedback hysteresis control circuit connects in series a resistor (RF2) and two capacitors (CF2 and CF3) and then connects these elements in parallel to the coil (L1) as a means for detecting the voltage obtained by adding the voltage proportional to the current ($I_L$) flowing into the coil to the output voltage (Vout).

The potential Vfb1 of the connection node n2 of the capacitor CF3 and capacitor CF2 is compared with the reference voltage Vref1 from the reference voltage source VREF1 with the hysteresis comparator HCMP and the switches SW1, SW2 are controlled for ON and OFF with an output of the hysteresis comparator HCMP.

Figure 5C:
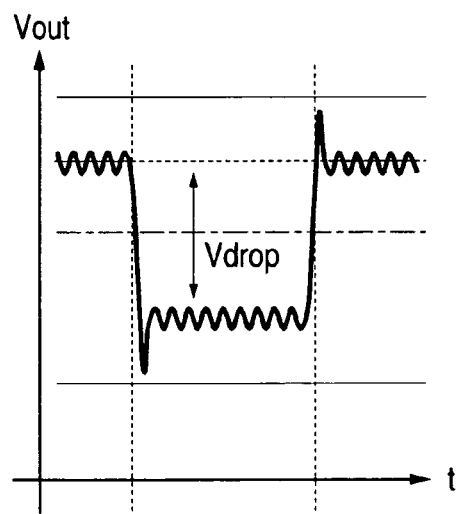
FIG. 5C illustrates the output voltage waveforms when the Droop control is performed and not performed.
Figure 5C:
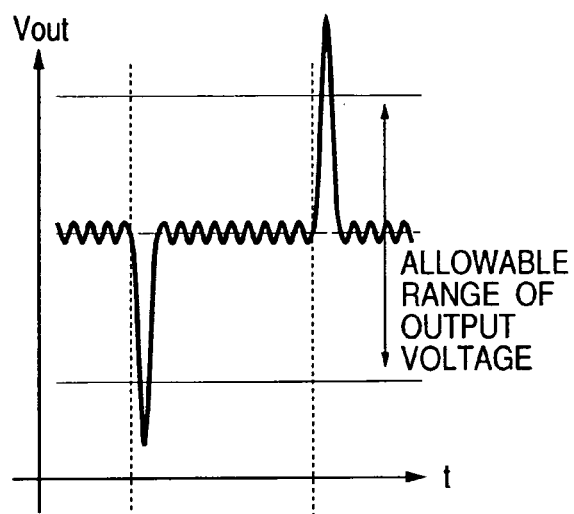
Figure 5C:
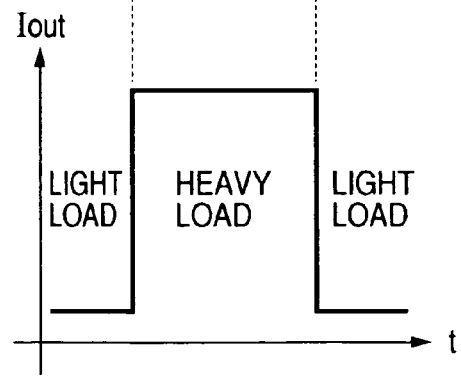
Figure 5C:
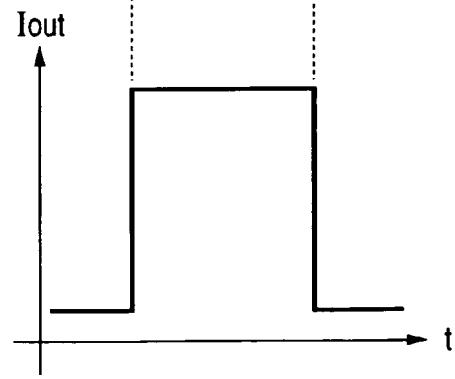
Figure 5D:
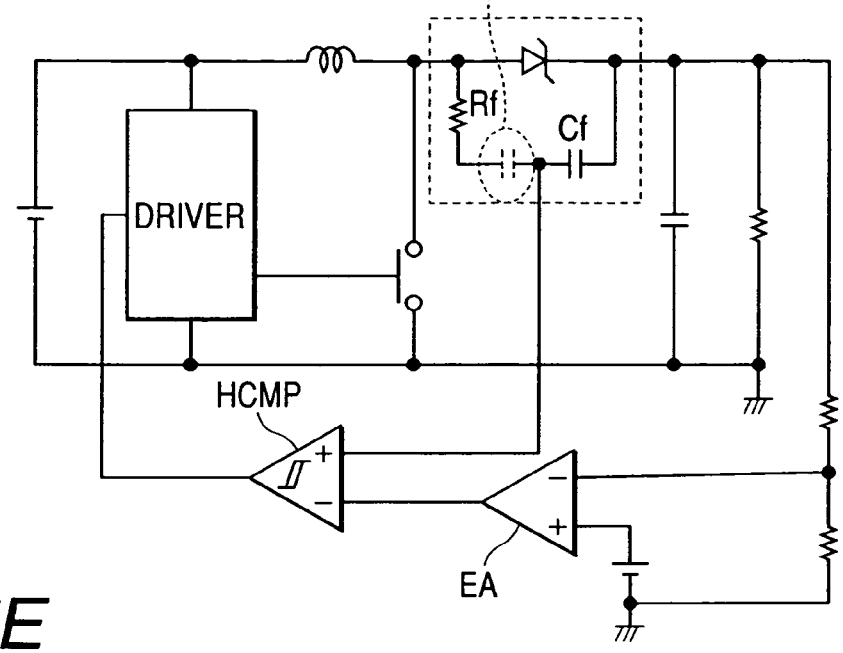
FIG. 5D illustrates an embodiment of the CR feedback hysteresis control circuit applied to the non-insulated voltage step-up type attained by improving the circuit of FIG. 5A in regard to the switching regulator of the hysteresis current mode to which the present invention is applied.
Figure 5E:
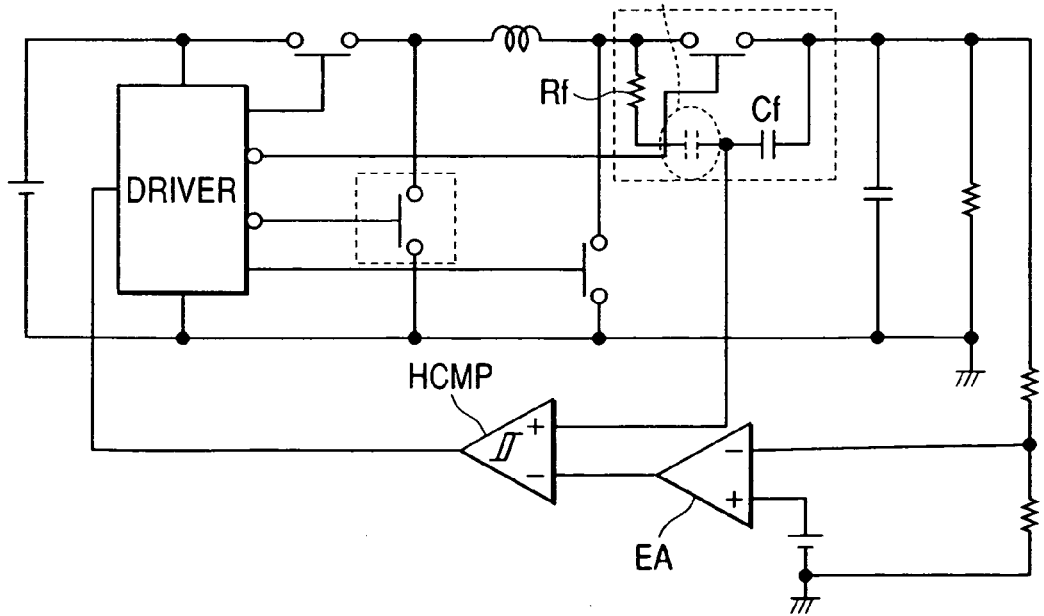
FIG. 5E illustrates an embodiment of the CR feedback hysteresis control circuit applied to the non-insulated voltage step-up and step-down type attained by improving the circuit of FIG. 5A in regard to the switching regulator of the hysteresis current mode to which the present invention is applied.
Figure 5F:
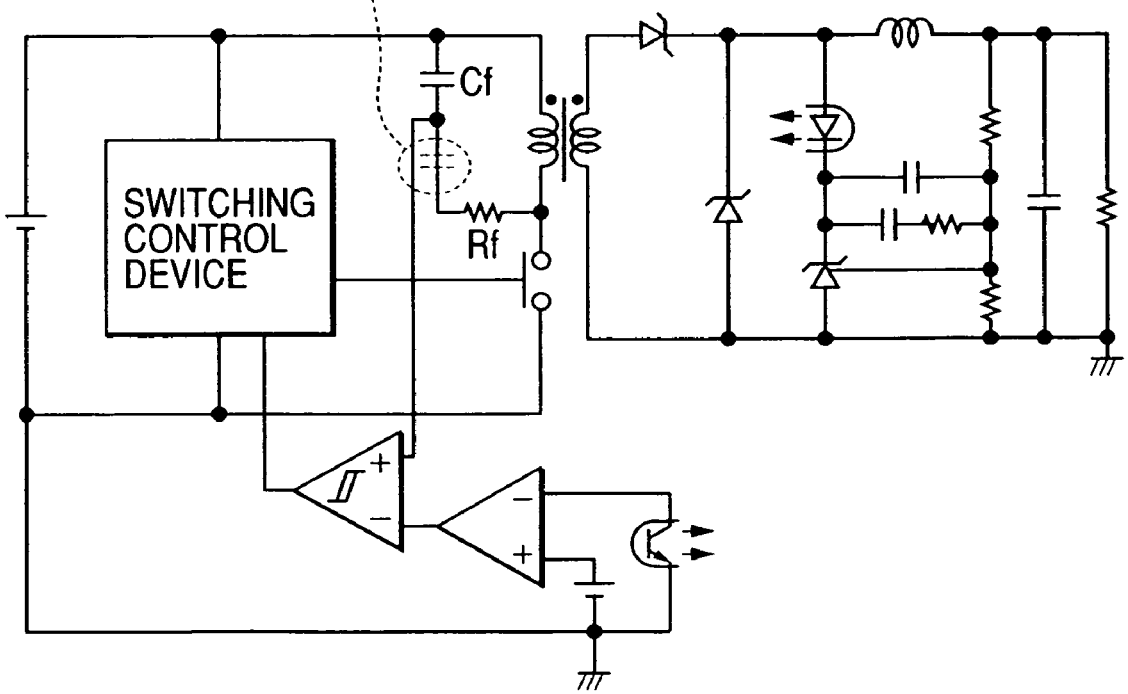
FIG. 5F illustrates an embodiment of the CR feedback hysteresis control circuit applied to the non-insulated voltage step-up and step-down type attained by improving the circuit of FIG. 5A in regard to the switching regulator of the hydteresis current mode to which the present invention is applied.
Figure 5I:
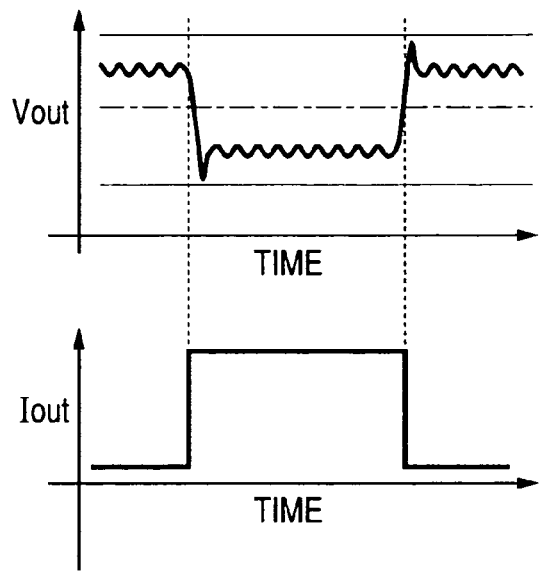
FIG. 5I illustrates a timing chart showing change of output voltage Vout for change of output current Iout under the condition that a capacitor Cf2 is not provided in FIG. 5B.
Figure 5J:
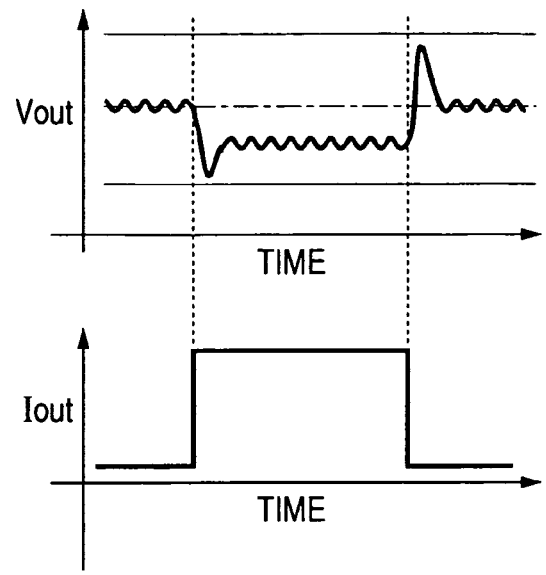
FIG. 5J illustrates a timing chart showing change of output voltage Vout for change of output current Iout under the condition that a capacitor Cf2 is provided in FIG. 5B.

Here, FIG. 5I illustrates the relationship between the output current Iout and output voltage Vout when the capacitor CF2 is not inserted, while FIG. 5J illustrates the relationship between the output current Iout and output voltage Vout when the capacitor CF2 is inserted.

When the capacitor CF2 is not inserted, the potential of the node n2 is reduced in proportion to the product (Rdcr× Iout) of the parasitic resistor RL of coil L1 and output current Iout. Therefore, when the output current Iout increases, the output voltage Vout is reduced to a large extent.

Meanwhile, when the capacitor CF2 is inserted, since the voltage proportional to the product (Rdcr×Iout) of the parasitic resistor RL of coil L1 and the output current Iout is divided with the capacitors CF2, CF3, amount of reduction of potential of the node n2 is reduced and amount of reduction of the output voltage Vout when the output current Iout increases can be adjusted with a ratio of the capacitors CF2, CF3.

Here, the variation range of the output voltage Vout during transitional change of the output current Iout can be minimized by matching the amount of reduction of the output voltage Vout when the output current Iout increases with the amount of overshoot of the output voltage Vout when the output current Iout is transiently reduced.

This CR feedback hysteresis control circuit can reduce the influence of parasitic resistor under the condition of T<$T_2$ or CF2>CF3 as expressed in the formula (4) by extracting the feedback signal between the capacitors CF2 and CF3.

$$Vfb1 = Vout + Vcf3 \quad \text{formula (4)}$$
$$= Vout + R_L \left\{ \frac{1 + s \cdot (L/R_L)}{1 + (CF2/CF3) + s \cdot RF2 \cdot CF3} \right\} I_L$$
$$= Vout + R_L \left( \frac{1 + s \cdot T}{1 + (CF2/CF3) + s \cdot T_2} \right) I_L$$

Here, $T_2$=RF2·CF3. The switching frequency (fsw2) of the CR feedback hysteresis control circuit of the present invention is expressed by the formula (5).

$$fsw2 = \frac{\{Vout + (CF3/CF2) \cdot Vhys\} \cdot [Vin - \{Vout + (CF3/CF2) \cdot Vhys\}]}{Vin \cdot Vhys \cdot RF2 \cdot CF3} \quad \text{formula (5)}$$

-continued
$$= \frac{\{Vout + (CF3/CF2) \cdot Vhys\} \cdot [Vin - \{Vout + (CF3/CF2) \cdot Vhys\}]}{Vin \cdot Vhys \cdot T_2}$$

When Vout>>(CF3/CF2)·Vhys, the formula (5) may be approximated as the formula (6)

$$fsw2 = \frac{\{Vout + (CF3/CF2) \cdot Vhys\} \cdot [Vin - \{Vout + (CF3/CF2) \cdot Vhys\}]}{Vin \cdot Vhys \cdot RF2 \cdot CF3} \quad \text{formula (6)}$$
$$\approx \frac{Vout \cdot (Vin - Vout)}{Vin \cdot Vhys \cdot T_2}$$

This means that when influence of voltage drop is reduced, it does not give any influence on the switching frequency. As a result, it is possible even when the switching frequency is high that voltage drop of parasitic resistor can be eliminated from the feedback signal. Moreover, voltage drop in the output voltage when the load is heavy can be reduced without dependence on the switching frequency only by adding only one capacitor for the requirement that the number of elements used in the external circuit must be reduced as much as possible.

Moreover, with reduction of the power supply voltage of LSI, high precision voltage control is requested even for change of voltage when the load is varied. It is also possible to reduce the series resistance of capacitor by connecting in parallel a smoothing capacitor, but this method will result in increase of cost and the number of elements used.

Therefore, as a high precision voltage control method for change of voltage when the load is varied, there is provided a Droop control method, wherein an output voltage is set higher than the reference voltage when the load is rather small, and the output voltage is set lower than the reference voltage when the load is rather heavy and thereby change of voltage including transitional change thereof when the load is varied is set within the allowable voltage range. FIG. 5C illustrates the output voltage waveforms when the output current is varied under the conditions that the Droop control is performed and not performed with the same smoothing capacitor.

This improved CR feedback hysteresis control circuit can set the voltage drop (Vdrop) when the Droop control is conducted using the parasitic resistor (Rdcr) of the coil (L1) without change of frequency.

Moreover, the similar effect can also be obtained as described below by replacing the coil (L1) with a diode, switch or transformer.

When Cf and Rf are connected across the coil, change of output voltage (Vout) cannot be fed back in direct to the hysteresis comparator (HCMP). Therefore, change of output voltage can be fed back in direct by connecting Cf and Rf across the diode as illustrated in FIG. 5D.

Similarly, when Cf and Rf are connected across the coil, change of output voltage cannot be fed back in direct to the hystreresis comparator (HCMP). Therefore, change of output voltage can be fed back in direct by connecting Cf and Rf across the switch as illustrated in FIG. 5E.

Similarly, control for the insulated primary side is required, the primary side must be insulated from the secondary side as illustrated in FIG. 5F. Therefore, when Cf and Rf are connected across the coil in the secondary side, the feedback signal must be sent to the primary side from the secondary side using a certain insulation means. However, the feedback can be realized in direct by connecting Cf and Rf across the transformer in the primary side without use of the insulation means.

When a signal is extracted between the resistor (Rf1) and capacitor (Cf1) or between the capacitor (Cf1) and capacitor (Cf2), the voltage (Vfb) obtained by adding V1 to the voltage proportional to the current flowing into respective elements can be detected. Therefore, the voltage proportional to the current flowing into respective elements can be detected and the current flowing respective elements can also be detected (formulae (7) to (10)) by simultaneously detecting the voltage V1 and obtaining difference between the feedback signal and output voltage as illustrated in FIGS. 5G($a$) to 5G($d$).

$$Coil: I1 \rightarrow Vfbl1-V1 \quad \text{formula(7)}$$

$$Diode: Id \rightarrow Vfbd1-V1 \quad \text{formula(8)}$$

$$Switch: Is \rightarrow Vfbs1-V1 \quad \text{formula(9)}$$

$$Transformer: It \rightarrow Vfbt1-V1 \quad \text{formula(10)}$$

For detection of current, a resistor for current detection is generally inserted. In this case, however, power consumption of LSI tends to increase and the power consumed in the current detection resistor cannot be ignored even when it is only a very small value. The current detection resistor is unnecessary when the CR feedback control detection unit is used for current detection. Moreover, since the feedback signal and current detection signal can be extracted only with a circuit, the circuit configuration may be simplified and the number of elements can be reduced.

Figure 6:
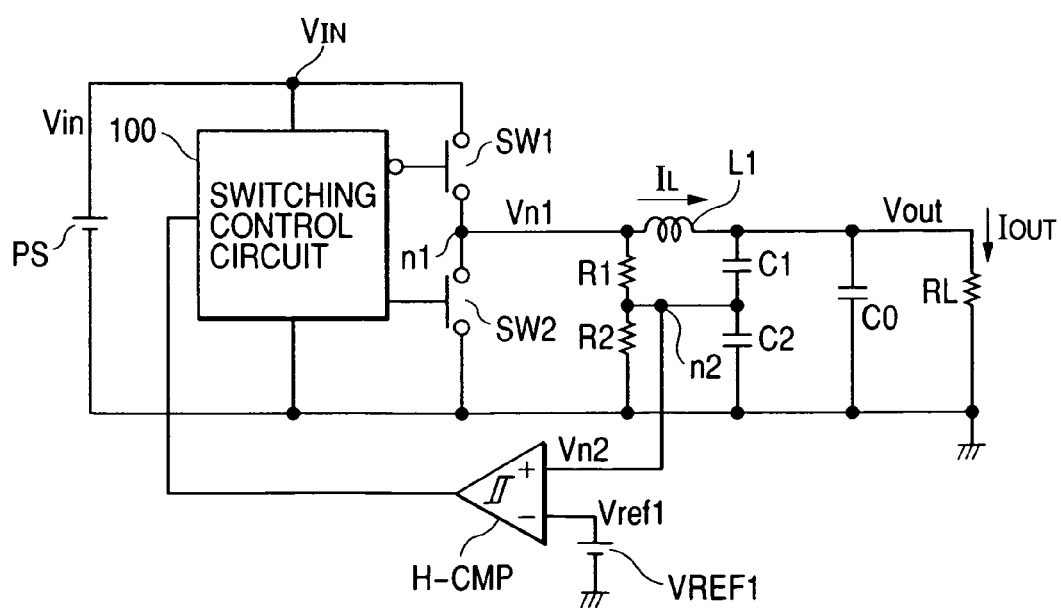
FIG. 6 is a structural diagram of circuit illustrating the sixth embodiment of the voltage step-down type switching regulator of the hysteresis current mode control system to which the present invention is applied.

FIG. 6 illustrates the sixth embodiment of the switching regulator of the present invention.

This embodiment can be configured by connecting the resistor R2 and capacitor C2 between the connecting node n2 of the resistor R1 and capacitor C1 and the grounding point in the circuit of the second embodiment of FIG. 2. According to this sixth embodiment, the merit that the output voltage Vout is adjusted with a ratio of the resistors R1 and R2 can be attained in addition to the merit of the second embodiment. Namely, in this embodiment, the output voltage V-out is given with the formula, Vout=R2/(R1+R2)·Vref1. Therefore, the output voltage Vout can be set freely without change of the reference voltage Vref1 by adjusting the ratio of the resistors R1 and R2.

Here, the capacitor C2 is provided to prevent deterioration of the transient response characteristic because delay or lead of phase is generated when the resistor R2 is provided. Such delay and lead of phase can be reduced by setting the resistance value and capacitance value to result in the relationship, R1·C1=R2·C2.

If delay or lead of phase may be ignored, it is enough to add only the resistor R2 and the capacitor C2 is unnecessary. Moreover, when it is requested to adjust delay or lead of phase positively, the capacitor C2 is allowed to have the value which does not satisfy the relationship エラー! リンク エラー! リンク エラー! リンク. Moreover, when the capacitor C3 is added as illustrated in FIG. 5A, voltage drop of the output voltage Vout can be adjusted when the output current Iout has increased.

Figure 7:
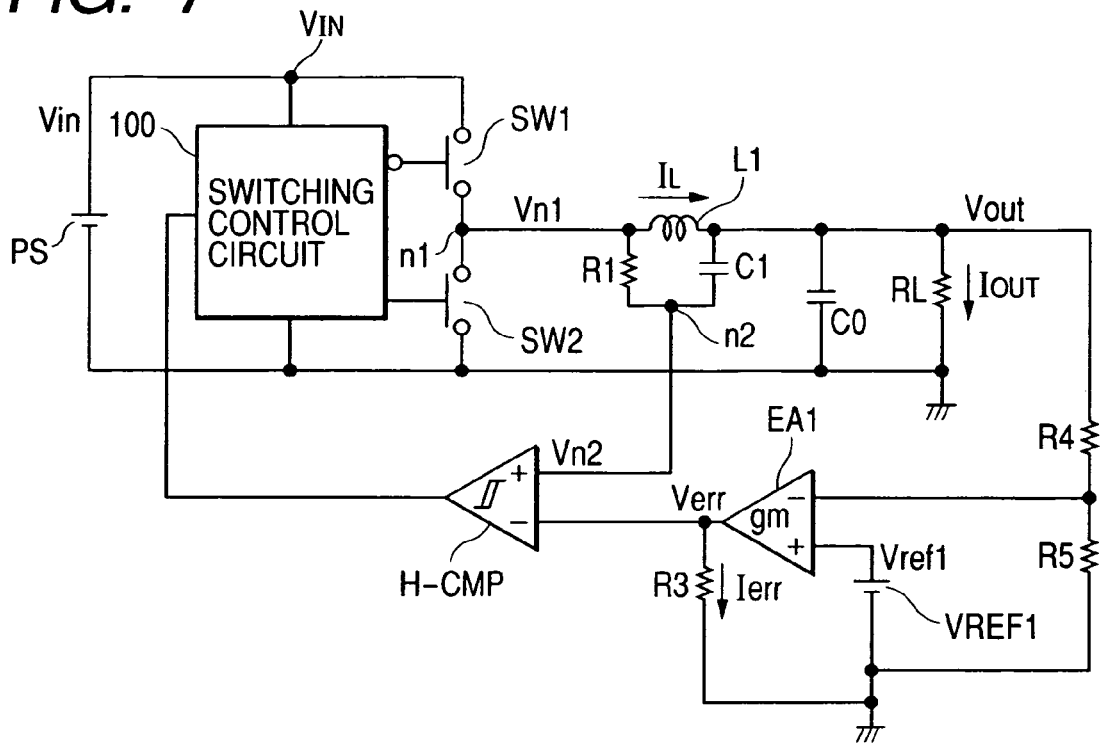
FIG. 7 is a structural diagram of circuit illustrating the seventh embodiment of the voltage step-down type switching regulator of the hysteresis current mode control system to which the present invention is applied.

FIG. 7 illustrates the seventh embodiment of the switching regulator of the present invention.

This embodiment is provided with resistors R4, R5 for dividing the output voltage Vout, an error amplifier EA1 consisting of a trans-conductance type amplifier (gm amplifier) for detecting a voltage difference between the divided voltage and reference voltage Vref1 and a resistor R3 connected between the output terminal of the error amplifier EA1 and the grounding point. The output terminal of the error amplifier EA1 is connected to the input terminal in the reference side of the comparator H-CMP. According to this embodiment, it is possible to attain the merit that voltage drop of the output voltage Vout is lower than that in the first to sixth embodiments because the output voltage is fine-adjusted with the error amplifier EA1 even there exists the parasitic resistor Rdcr in the coil. However, this embodiment also has the demerit that variation range of output voltage Vout in the transitional change of the output current Iout becomes large.

Moreover, this embodiment has the merit that the output voltage Vout may be set without change of the reference voltage Vref1 with a resistance ratio of the resistors R4 and R5, although response to change of output current is rather delayed from that of the first embodiment as much as existence of the error amplifier EA1 and resistor R3. In this embodiment, the output voltage Vout may be given with the formula, Vout=R5/(R4+R5)·Vref1.

In this embodiment, the resistor R3 is provided between the output terminal of the error amplifier EA1 and the grounding point, but this resistor R3 can also be connected between the output terminal of the regulator, namely one terminal of the coil L1 and the output terminal of the error amplifier EA1. In this case, almost similar effect can also be obtained. The resistors R4, R5 can be provided within the IC, but it is also possible for user that these can also be provided as the external elements in order to freely set the output voltage. When the capacitor C1 and resistor R1 connected in parallel to the coil L1 are provided as the external elements as in the case of FIG. 1 and FIG. 2, it is very useful because the number of external terminals (pins) of IC do not increase even when the resistors R4, R5 are formed as the external elements.

Figure 8:
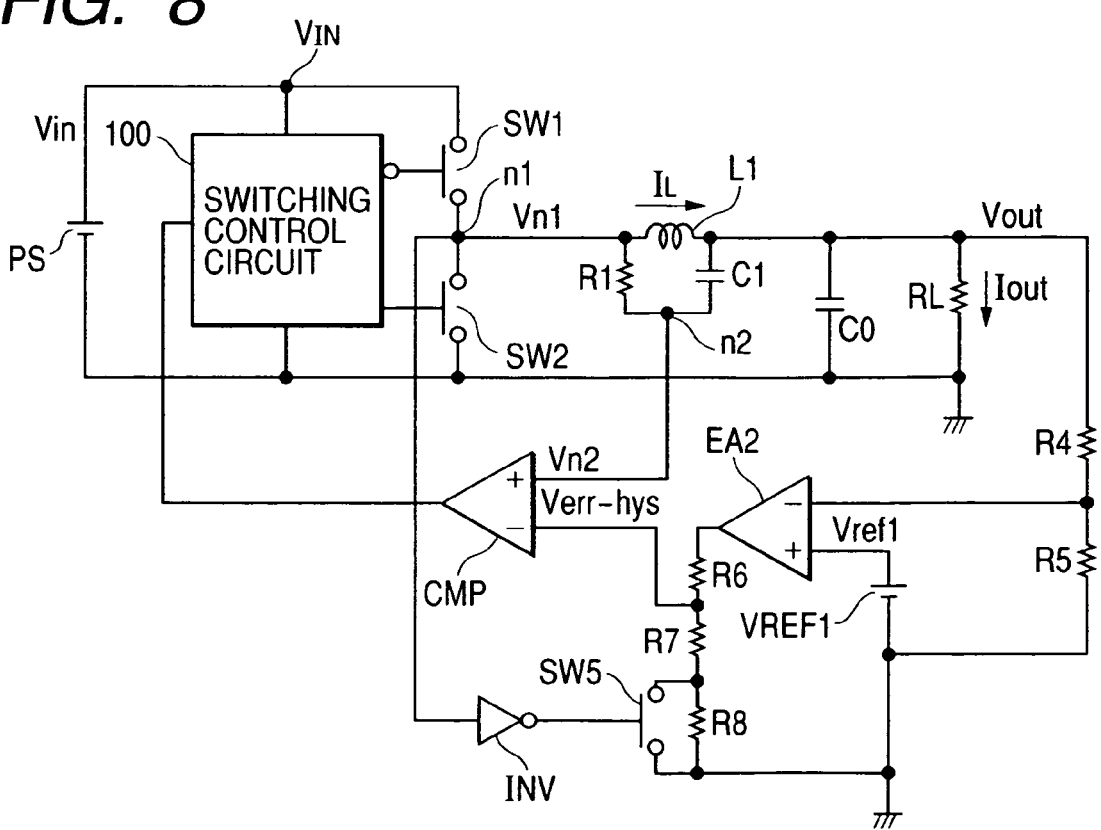
FIG. 8 is a structural diagram of circuit illustrating the eighth embodiment of the voltage step-down type switching regulator of the hysteresis current mode control system to which the present invention is applied.

FIG. 8 illustrates the eighth embodiment of the switching regulator of the present invention.

In this embodiment, the fourth embodiment of FIG. 4A and the seventh embodiment of FIG. 7 are combined. Namely, in the embodiment of FIG. 7, the hysteresis comparator H-CMP is replaced with the ordinary comparator CMP, the series resistors R6, R7, R8 are connected between the output terminal of the error amplifier EA1 and the grounding point and the switch SW3 is provided in parallel to the resistor R8 to switch the comparison voltage applied to the inverted input terminal of the comparator CMP. Thereby, the comparator CMP shows the hysteresis characteristic.

In this embodiment, the switch SW3 is configured to control ON and OFF the potential of the connection node n1 of the main switch SW1 and synchronous switch SW2 with the signal inverted by the inverter INV. This configuration has been described as an example of modification of the embodiment of FIG. 4A. This switch SW3 is capable of controlling in direct such potential with an output of the comparator CMP as in the case of the embodiment of FIG. 4A. Accordingly, the inverter INV may be eliminated. Moreover, in this embodiment, a voltage input-voltage output type differential amplifier can be used, in place of the gm amplifier, as the error amplifier EA.

Figure 9:
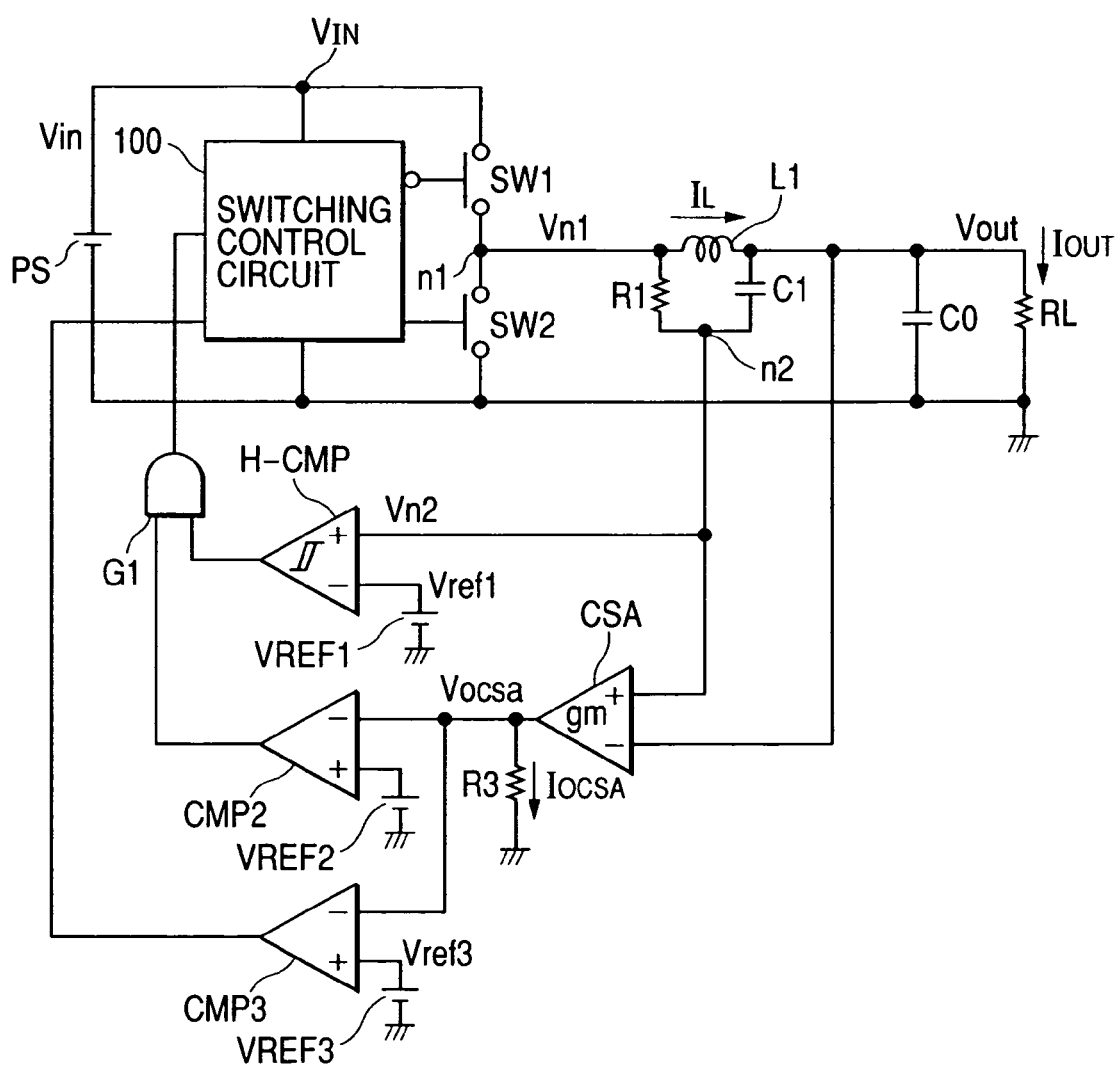
FIG. 9 is a structural diagram of circuit illustrating the ninth embodiment of the voltage step-down type switching regulator of the hysteresis current mode control system to which the present invention is applied.

FIG. 9 illustrates the ninth embodiment of the switching regulator of the present invention.

This embodiment is configured, in the second embodiment of FIG. 2, with a current sense amplifier CSA consisting of gm amplifier which inputs the output voltage Vout and the potential Vn2 of the node n2, a resistor R3 for converting the output current Iocsa of the current sense amplifier to a voltage, a first comparator CMP2 for comparing the converted voltage with the reference voltage Vref2, a second comparator CMP3 for comparing the voltage Vocsa converted by the resistor R3 with the reference voltage Vref3 (<Vref2), and an AND gate G1 for obtaining logical sum of the output of comparator CMP2 and the output of hyteresis comparator H-CMP. Accordingly, the condition where an over current flows and the condition of light load can be detected respectively to change the control by the switching control circuit 100 depending on the condition of regulator.

In the circuit of this embodiment, when the output current Iout increases, difference between the output voltage Vout and potential Vn2 of the node n2 becomes large. Thereby, the output current Iocsa of the current sense amplifier CSA increases and the voltage Vocsa also rises. When the voltage Vocsa becomes higher than the reference voltage Vref2, an output of the comparator CMP2 changes to the low level and thereby the output of AND gate G1 is fixed to the low level. Accordingly, the switching control circuit 100 turns OFF the main switch SW1 and turns ON the synchronous switch SW2 to reduce the current flowing into the coil. As a result, the output current Iout can be limited (over current protection) not to exceed a certain level.

Moreover, when the output current Iout is reduced, difference between the output voltage Vout and the potential Vn2 of the node n2 is also reduced and thereby the output current Iocsa of the current sense amplifier CSA is reduced to reduce the voltage Vocsa. When the voltage Vocsa becomes lower than the reference voltage Vref3, an output of the comparator CMP3 changes to the high level. In this timing, the switching control circuit 100 simultaneously turns OFF the main switch SW1 and synchronous switch SW2 to reduce the coil current. Thereby, the power efficiency can be improved under the light load condition where only the output current Iout under the predetermined value flows.

Figure 10:
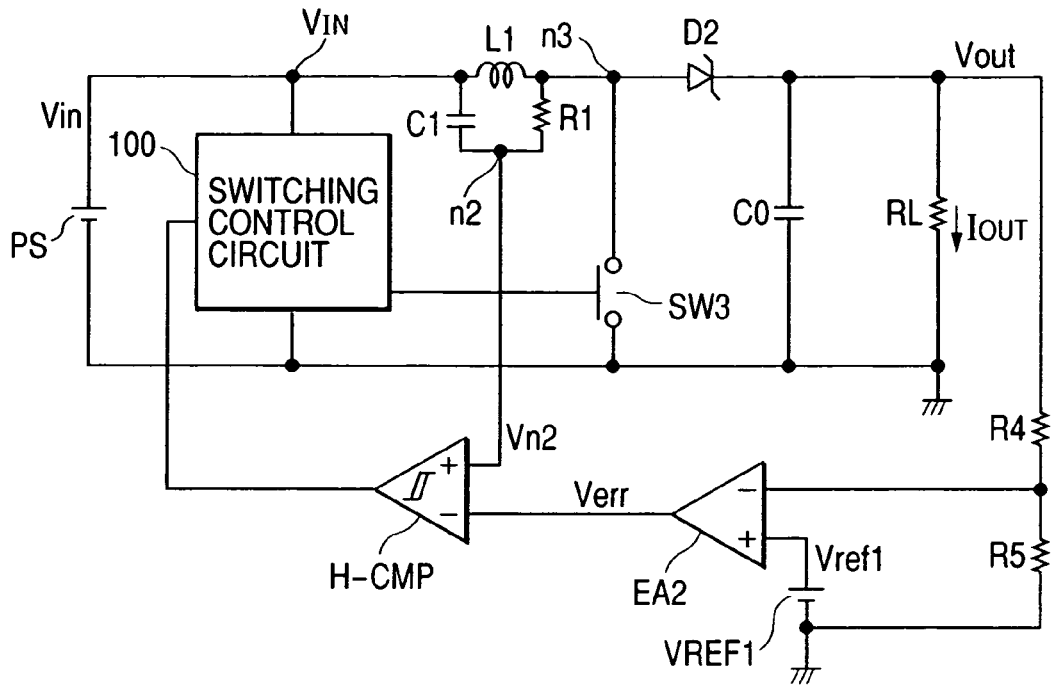
FIG. 10 is a structural diagram of circuit illustrating an embodiment of the voltage step-up type switching regulator of the hysteresis current mode control system to which the present invention is applied.

FIG. 10 illustrates an embodiment where the present invention is applied to the voltage step-up type switching regulator of the hysteresis current mode control system.

In the voltage step-up type switching regulator of this embodiment, the synchronous switch (SW2) is replaced with a diode D2 for preventing inverse current which is provided in series to the coil L1. Moreover, the main switch SW3 is provided between the connection node n3 of the coil L1 and diode D2 and the grounding point.

In the conventional switching regulator of the hysteresis current mode control system (U.S. Pat. No. 5,825,165), a resistor (216) for sensing current is provided in series with the coil L1, but in the embodiment of FIG. 10 of the present invention, the serially connected capacitor C1 and resistor R1 are connected in parallel to the coil L1 and the potential Vn2 of the connection node n2 of the capacitor C1 and resistor R1 is inputted to the non-inverted input terminal of the hysteresis comparator H-CMP. An output Verr of the error amplifier EA2 is inputted to the inverted input terminal of the hysteresis comparator H-CMP in order to compare the voltage obtained by dividing the output voltage Vout with the resistors R4 and R5 with the reference voltage Vref1. Even in this embodiment, since the resistor for sensing current is not provided in series to the coil L1, there is provided the merit that power consumption may be reduced in comparison with the conventional regulator.

Here, it is also possible that a synchronous switch which is complementarily turned ON and OFF for the main switch SW3 is provided in place of the diode D2 and the reference voltage Vref1 is impressed in direct to the hysteresis comparator H-CMP by eliminating the error amplifier EA2 and resistors R4, R5 for adjusting the output voltage.

Moreover, like the embodiment of FIG. 8, it is also possible to use the ordinary comparator in place of the hysteresis comparator H-CMP and switch the reference voltage to give the hysteresis characteristic to such comparator. Furthermore, the capacitor C1 and resistor R1 which are connected in series are provided in parallel to the diode D2 in place of connecting the serially connected capacitor C1 and resistor R1 in parallel to the coil L1. However, in this case, it is recommended to connect the capacitor C1 in the side of output terminal providing the voltage changing to a large extent and to connect the resistor R1 in the side of anode terminal of the diode D2.

Figure 11:
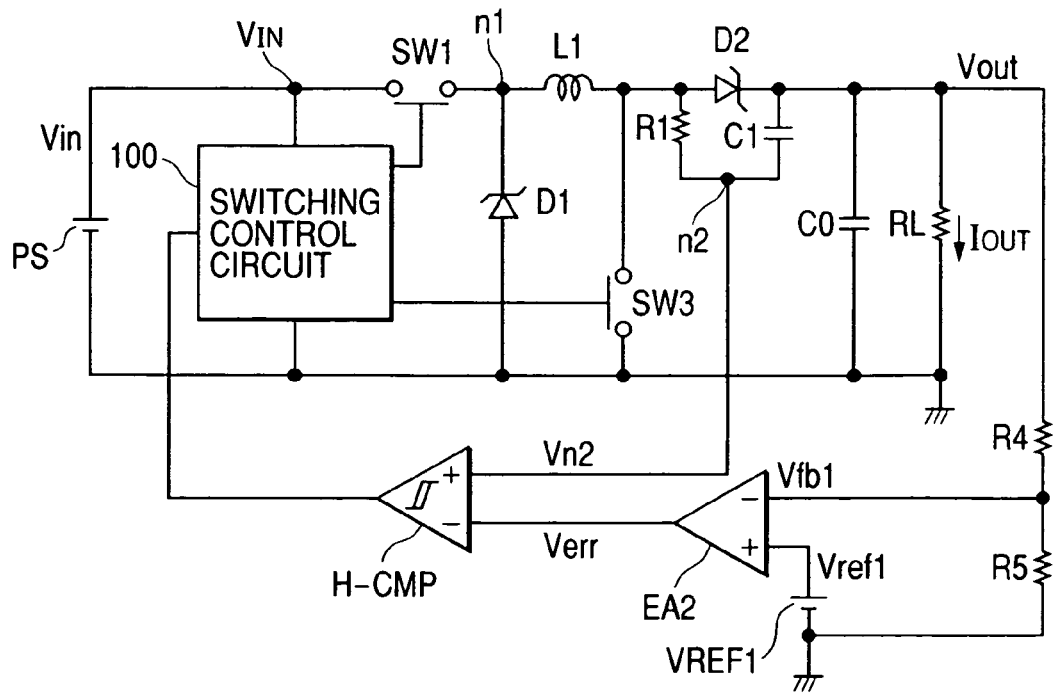
FIG. 11 is a structural diagram of circuit illustrating the embodiment of the voltage step-up and step-down type switching regulator of the hysteresis current mode control system to which the present invention is applied.

FIG. 11 illustrates an embodiment to which the present invention is applied to the voltage step-up and step-down type switching regulator which can step up and step down the voltage.

This voltage step-up and step-down type switching regulator of this embodiment has the circuit configuration that the switch SW1 is provided in series to the coil L1 in the voltage step-up type switching regulator of FIG. 10 and moreover a backward diode D1 is added between the connection node n1 of the switch SW1 and coil L1 and the grounding point. The switches SW1 and SW3 may be turned ON and OFF in the same timing or may be turned ON and OFF after a certain delay time.

In this embodiment, the current sensing resistor in series to the coil L1 is eliminated as in the case of the embodiment of FIG. 10, the coil L1 is replaced with the serially connected capacitor C1 and resistor R1 in parallel to the diode D2, and the potential of the connection node n2 of the capacitor C1 and resistor R1 is inputted to the non-inverted input terminal of the hysteresis comparator H-CMP. This embodiment also provides the merit that power consumption is small in comparison with the conventional regulator because a series resistor for sensing the current is not provided.

Here, it is also possible that the diodes D1, D2 may be replaced with a synchronous switch which is complementarily turned ON and OFF for the main switches SW1, SW3 and that the error amplifier EA2 and resistors R4, R5 which can adjust the output voltage are eliminated and the reference voltage Vref1 is applied in direct to the hysteresis comparator H-CMP. Moreover, like the embodiment of FIG. 8, the hysteresis comparator H-CMP is replaced with the ordinary comparator and the reference voltage thereof is switched to provide the hysteresis characteristic.

Furthermore, the serially connected capacitor C1 and resistor R1 may be connected in parallel to the coil L1 like the embodiment of FIG. 10, in place of connecting the serially connected capacitor C1 and resistor R1 in parallel to the diode D2. In this case, the capacitor C1 and resistor R1 may be connected in the relationship of FIG. 10 and the capacitor C1 may be connected in the side of connection node n1 with the switch SW1, while the resistor R1 may be connected in the side of anode terminal of the diode D2.

Figure 12:
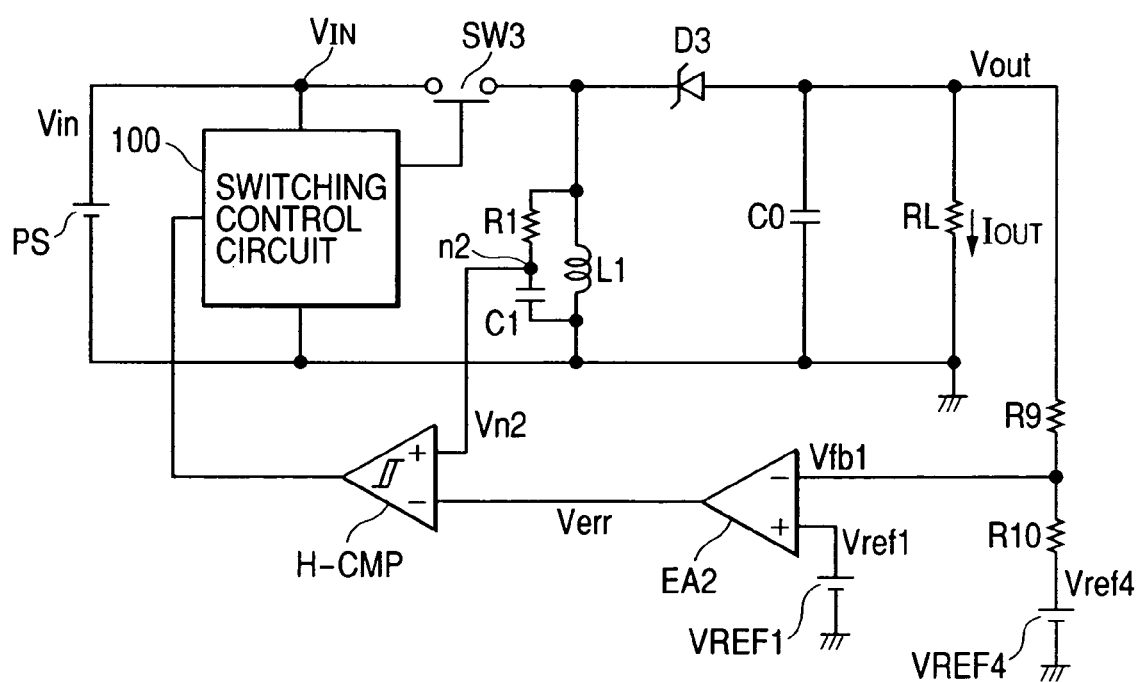
FIG. 12 is a structural diagram of circuit illustrating the embodiment of the switching regulator of the hysteresis current mode control system to generate negative voltage to which the present invention is applied.

FIG. 12 illustrates an embodiment where the present invention is applied to the switching regulator of the hysteresis current mode control system which generates a negative voltage.

The negative voltage generating switching regulator of this embodiment has a structure that allocation of coil L1 and switch SW3 is inverted in the voltage step-up type switching regulator of FIG. 10. Moreover, the diode D3 for preventing backward current is inverted in allocation from the diode D2 of FIG. 10. In this embodiment, the resistor for sensing current in series to the coil L1 is not provided as in the case of the embodiment of FIG. 10, the serially connected capacitor C1 and resistor R1 are connected in parallel to the coil L1, and the potential of the connection node n2 of the capacitor C1 and resistor R1 is inputted to the non-inverted input terminal of the hysteresis comparator H-CMP. Even in this embodiment, since the serial resistor for sensing current is not provided, there is provided a merit that power consumption can be reduced in comparison with the conventional switching regulator.

Here, it is also possible that the diode D3 is replaced with the synchronous switch which is complementarily turned ON and OFF to the main switch SW3 and the error amplifier EA2 and resistors R4, R5 which can adjust the output voltage are eliminated to apply in direct the reference voltage Vref1 to the hysteresis comparator H-CMP. Moreover, like the embodiment of FIG. 8, the hysteresis comparator H-CMP is replaced with the ordinary comparator to switch the reference voltage thereof in order to provide the hysteresis characteristic.

Figure 13:
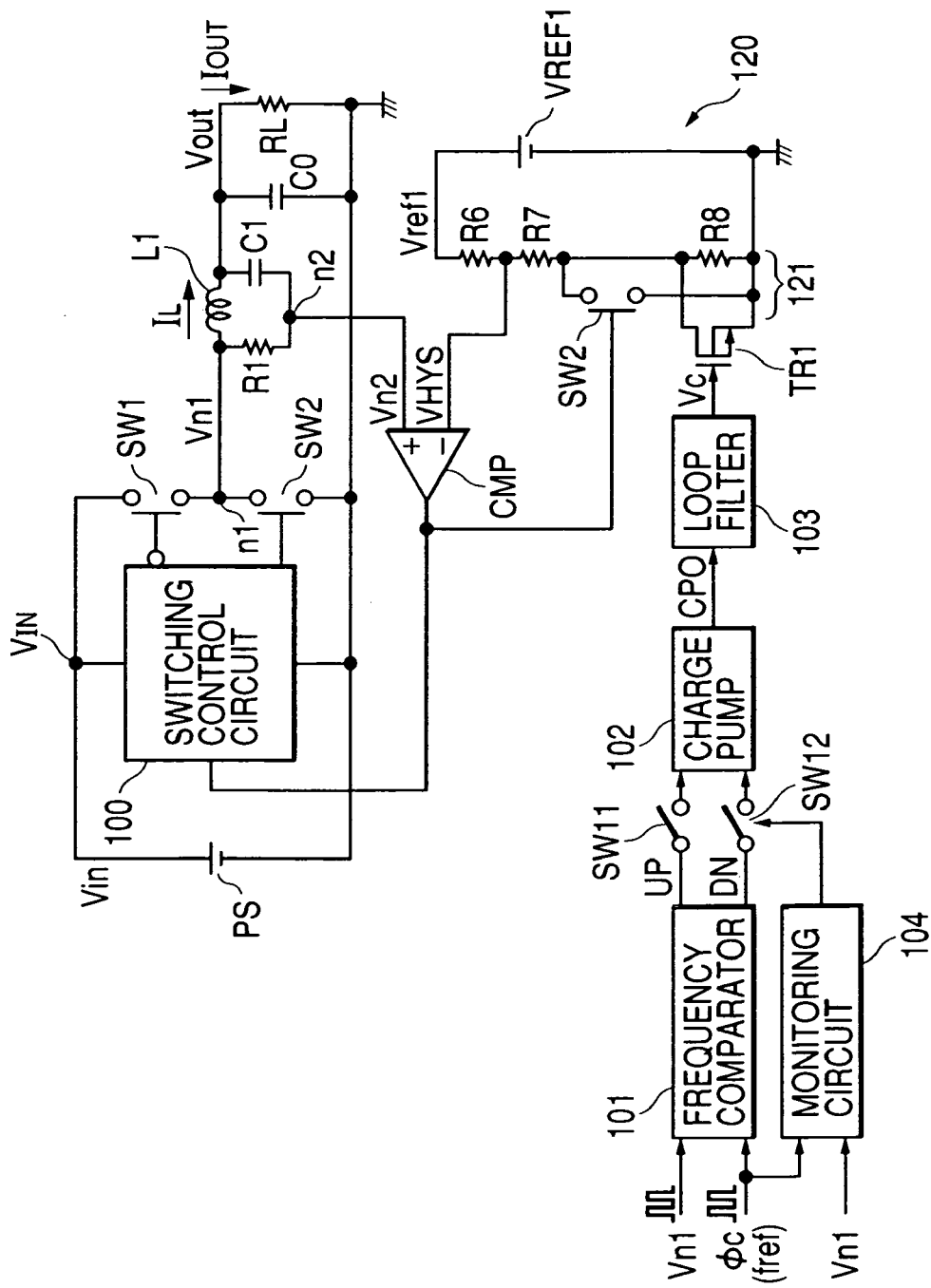
FIG. 13 is a structural diagram of circuit illustrating the embodiment of the circuit to generate the reference voltage having the hysteresis characteristic of switching regulator of the second invention of the present invention.

FIG. 13 illustrates an embodiment of the second invention of the present specification.

In this embodiment, the second invention is applied to the switching regulator where the reference voltage VHYS of two stages are generated as the voltage to be supplied to the comparator CMP like the embodiment of FIG. 4A in order to give the hysteresis characteristic. In more practical, the MOSFET TR1 is provided in parallel to the resistor R8 of the resistance dividing circuit 121 which generates the reference voltage VHYS of two stages applied to the comparator CMP by dividing the reference voltage Vref1 of the reference power source VREF1 with the resistors R6,R7, R8 and the ON resistance of the MOSFET TR1 is varied with the circuit having the structure similar to the PLL (Phase-Locked Loop) in order to compensate for the reference voltage VHYS generated with the resistance dividing circuit 121.

In the circuits of FIG. 1, FIG. 2 and FIG. 4A, it is apparent from the formula (2) that the switching frequency fsw varies when the input voltage Vin and output voltage Vout are changed. In addition, when the switching frequency fsw of regulator varies and it is matched with the communication frequency in the electronic device having the communication function and audio reproducing function, there is probability for generation of beat noise in the audible frequency band due to the electromagnetic interference. Therefore, in this embodiment, generation of noise is controlled by compensating for the reference voltage VHYS so that the switching frequency fsw of regulator is always matched with the frequency fref of the reference clock φc even when the input voltage Vin and output voltage Vout are changed.

In more practical, the switching regulator of this embodiment comprises a frequency comparator 101 which detects difference between the frequency of the potential Vn1 (the control signal of switch SW1 is also allowable) of the connection node n1 of the switches SW1 and SW2 which changes in the same period as the switching frequency fsw of the regulator and the reference clock φc of the system and outputs the signals UP, DN depending on the frequency difference, a charge pump circuit 102 which is operated with the output signals UP, DN of the frequency comparator 101, and a loop filter 103 for generating the control voltage Vc with inclusion of a capacitor which is charged and discharged with the charge pump circuit 102. Accordingly, the voltage Vc of the loop filter 103 is applied to the gate terminal of the MOSFET TR1. Moreover, the switches SW11, SW12 are provided between the loop filter 103 and charge pump circuit 102. A PLL circuit generally uses a phase comparator and both phase comparator and frequency comparator are sometimes provided in order to assure quick pull-in of the frequency. In the circuit configuration of this embodiment, only the frequency comparator is used.

The circuit of this embodiment is operated to increase, when the potential Vn1 of the node n1, namely the switching frequency of regulator becomes relatively high, the voltage Vc of the loop filter 103 to reduce the ON resistance of the MOSFET TR1 and thereby to reduce the combined resistance with the resistor R8 to lower the reference voltage VHYS. Moreover, when the changing frequency of the potential Vn1 of the node n1 becomes relatively lower, the voltage Vc of the loop filter 103 is also lowered to increase the ON resistance of the MOSFET TR1. Thereby, the combined resistance with the resistor R8 becomes large to increase the reference voltage VHYS.

Figure 14:
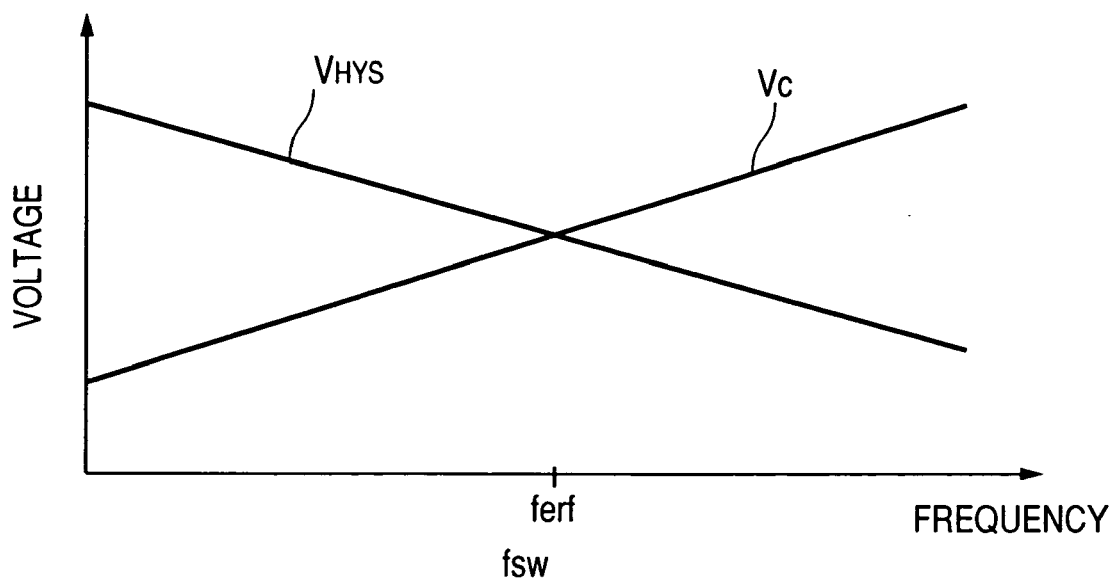
FIG. 14 is a graph illustrating the relationship between the switching frequency fsw and the reference voltage VHYS to be applied to the comparator in the switching regulator of the second invention of the present invention.

FIG. 14 illustrates the relationship among the switching frequency fsw of regulator and volgage Vc of loop filter 103 and the reference voltage VHYS. As in the case of FIG. 14, the switching frequency fsw of the regulator is controlled to be always matched with or set to the value near the frequency fref of the reference clock φc of the system by compensating for the reference voltage VHYS to be inversely proportional to the voltage Vc which increases proportionally to the switching frequency fsw. As a result, it can be prevented that beat noise is generated in the audible frequency range with the switching noise generated by the regulator.

Here, when the reference voltage VHYS is changed by controlling the ON resistance of the MOSFET TR1 through operation of the PLL circuit described above, since the period where the potential Vn1 of the node n1 varies is extended or shortened with the control of ON/OFF period of the switches SW1, SW2 executed when the output current Iout is varied (transient periods T2, T4) as described with reference to the timing chart of FIGS. 3A to 3E, an output of the frequency comparator 101 is temporarily interfered. Therefore, in this embodiment, a monitoring circuit 104 is provided to monitor the potential Vn1 (control signal of switch SW1 is also allowable) of the connection node n1 of the switches SW1 and SW2 and the switches SW11, SW12 are quickly controlled, when the ON period of the switch SW1 is continued for the predetermined period or longer, to become OFF so that an output of the frequency comparator 101 is not supplied to the charge pump 102.

The present invention has been described above practically with reference to the preferred embodiments, but the present invention is not limited to above embodiments and allows various changes or modifications within the scope not departing from the claims. For example, in above embodiments, the synchronous switch SW2 is provided in series to the main switch SW1 in order to operate to reduce the current to the coil when the switch SW1 is turned OFF. But, this synchronous switch SW2 may be replaced with a diode. Moreover, in the embodiment of FIG. 13, the monitoring circuit 104 monitors the potential Vn1 of the node n1 in view of suspending compensation for the reference voltage VHYS during the period where the output current varies but it is also possible to form the structure that compensating operation for the reference voltage VHYS is suspended by monitoring the potential of the other area such as the node n2.

The switching regulator invented as the present invention has been described above as the example where it is independently used as the power supply device of an electronic device in the application field considered as the background of the present invention, but the switching regulator of the present invention can also be used widely into the switching regulator and DC—DC converter in the semiconductor integrated circuit device.

The effects of the typical inventions disclosed in the present invention are as follows.

That is, according to the present invention, there is provided a switching power supply device of the hysteresis current mode control system which assures excellent response characteristic for change of output current and lower power consumption. Thereby, it is possible to realize a portable electronic device which can reduce consumption of battery in the power supply device to be driven with the battery and can ensure long-term operation only with single battery or with single charge thereof.

Moreover, according to the present invention, it is possible to realize the switching power supply device of hysteresis current mode control system which can generate high precision voltage where the switching frequency does not depend on coil inductance and amplitude of coil current. In addition, a switching power supply device can also be realized wherein generation of noise which may give adverse effect on the system can be suppressed because the switching frequency does not vary.

Figure 16:
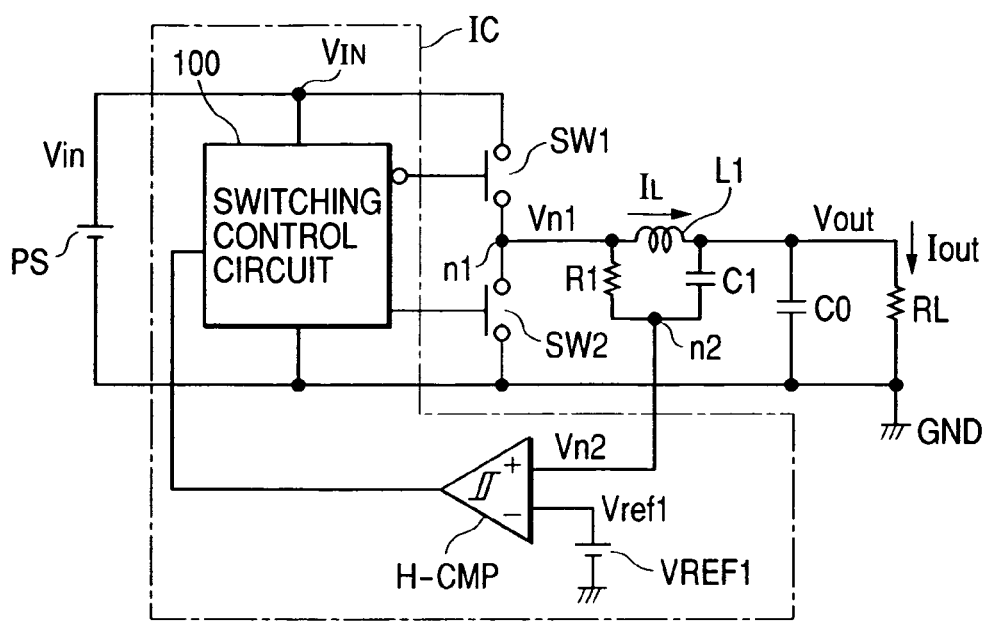
FIG. 16 is a structural diagram of circuit illustrating an embodiment of the voltage step-down type switching regulator of the hysteresis current mode control system to which the present invention is applied.

FIG. 16 illustrates an embodiment of the voltage step-down type switching regulator of hysteresis current mode control system to which the present invention is applied.

The switching regulator of this embodiment comprises switches SW1, SW2 consisting of MOSFET connected in series between the voltage input terminal VIN to which a DC voltage Vin is inputted from a DC power supply PS such as a battery and the grounding point (GND), the coil L1 as an inductor connected between the intermediate node n1 of the switches SW1, SW2 and the output terminal VOUT, the smoothing capacitor C0 connected between the output terminal VOUT and the grounding-point, the switching control circuit 100 for generating the signal (control pulse) which is inputted to the gates of the switches SW1, SW2 to control ON and OFF these switches, serially connected resistor R1 and capacitor C1 connected in parallel to the coil L1, and the hysteresis comparator H-CMP for comparing the potential Vn2 of the connection node n2 of the resistor R1 and capacitor C1 with the reference voltage Vref1 from the reference voltage source VREF1. Thereby, an output of the comparator H-CMP is supplied to the switching control circuit 100.

In FIG. 16, the semiconductor integrated circuit as a load like CPU which is operated by receiving the voltage from the switching regulator of this embodiment is defined as the resistor RL. Since the switches SW1 and SW2 are complementarily turned ON and OFF, the current is outputted from the coil L1 depending on the duty ratio of the ON/OFF control pulses. Here, the hysteresis comparator H-CMP means the comparator which shows a lower threshold value when the voltage inputted to the non-inverted input terminal is higher than the reference voltage impressed to the inverted input terminal and shows a threshold value which is increased by the predetermined potential when the voltage inputted to the non-inverted input terminal is lower than the reference voltage impressed to the inverted input terminal. Since the comparator circuit having such characteristic is well known, illustration and description of the practical circuit are eliminated here. As the comparator, it is preferable to use the circuit formed of MOSFET to show higher input impedance.

In FIG. 16, the part enclosed by a chain line is configured as a semiconductor integrated circuit formed on a semiconductor chip such as single crystal silicon. Namely, the coil L1, capacitor C1, resistor R1, switches SW1, SW2 are connected as the external elements. Therefore, a highly accurate regulator may be realized.

Figure 17:
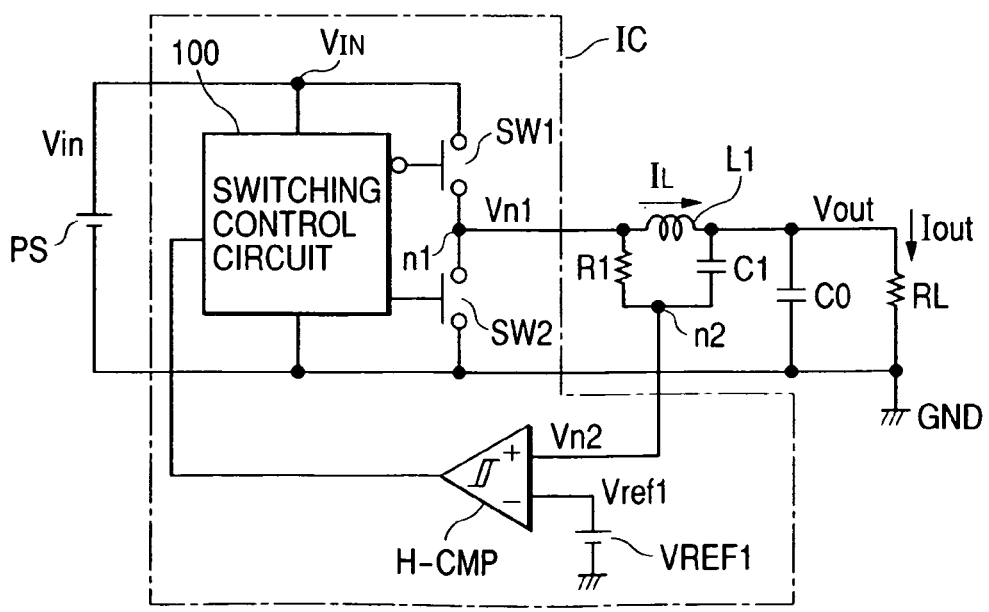
FIG. 17 is a structural diagram of circuit illustrating a modification example of the switching regulator of FIG. 1.

However, the regulator is not limited only to such structure and it is also possible, as illustrated in FIG. 17, to provide the switches SW1, SW2 into the IC chip and to provide the capacitor C1 and resistor R1 which are parallel to the coil L1 into the IC chip. The number of components of the power supply device can be reduced to realize reduction in size by providing these elements into the IC chip. The switches SW1, SW2 are preferably formed of the external elements in the power supply device to be used in the system which provides high level output current because it is required to supply comparatively large current. However, in the power supply device used in the system which provide low level output current, the elements formed on the chip may be used.

Next, practical operations of the switching regulator of this embodiment will be described with reference to the timing chart of FIGS. 18A to 18E.

The switching regulator of this embodiment inverts an output of the comparator when the potential Vn2 of the connection node n2 of the resistor R1 and capacitor C1 becomes lower than the reference voltage Vref inputted to the hysteresis comparator H-CMP. Thereby, the main switch SW1 supplying the current to the coil L1 is switched to ON state from OFF state with the switching control circuit 100 and the synchronous switch SW2 operating to reduce the current flowing into the coil L1 is synchronously turned OFF from ON. Accordingly, the current flows into the coil L1 from the power supply terminal Vin via the switch SW1. In this timing, the capacitor C1 is charged via the resistor R1 and the potential Vn2 of the connection node n2 gradually rises.

Moreover, the hysteresis comparator H-CMP inverts its output when the potential Vn2 of the connection node n2 becomes higher than Vref+Vhys under the condition that the hysteresis voltage of comparator is defined as Vhys. Accordingly, the switch SW1 is turned OFF from ON with the switching control circuit 100 and the switch SW2 is synchronously turned ON from OFF, respectively. Thereby, the current flowing into the coil L1 is reduced with the switch SW2. In this case, the capacitor C1 is discharged via the resistor R1 and the potential Vn2 of the connection node n2 drops gradually.

Figure 18A:
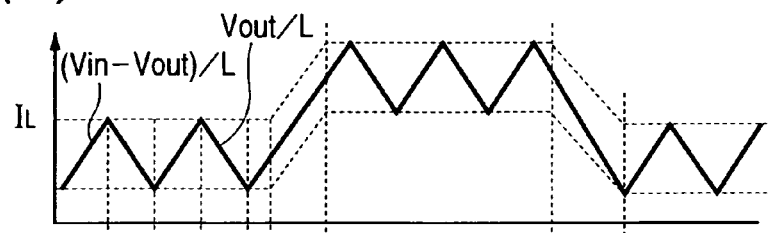
FIGS. 18A to 18E are timing charts illustrating changes of coil current of the switching regulator and output current and the ON and OFF timings of the main switch and synchronous switch.

With repetition of the operations described above, the current IL flowing into the coil L1 changes in the shape of the triangular wave as illustrated in FIG. 18A. The coil current IL is expressed as (Vin−Vout)/L in the increasing period and as Vout/L in the decreasing period when the coil inductance is defined as L.

Accordingly, an almost stable current IL is supplied to the coil L1 under the steady condition (during the periods of T1, T3, T5 of FIG. 18C) where the output current Iout is constant. In this case, when a duty ratio ton/(ton+toff) of the signal to control ON and OFF the switch SW1 is defined as N, the output voltage Vout of the regulator is expressed as Vout=N·Vin. Here, the ton indicates the ON period of switch, while toff indicates the OFF period of switch. When the switches SW1 and SW2 are to be changed over, these switches are controlled to avoid that these two switches are turned ON simultaneously and the through-current flows by providing the predetermined dead band as illustrated in FIG. 18D and FIG. 18E.

Figure 18B:
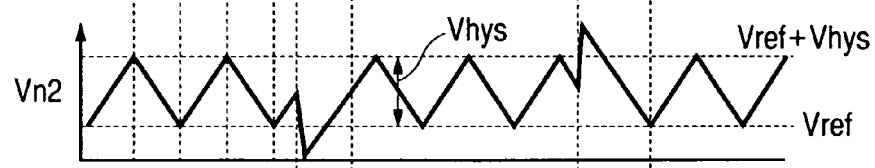
Figure 18C:
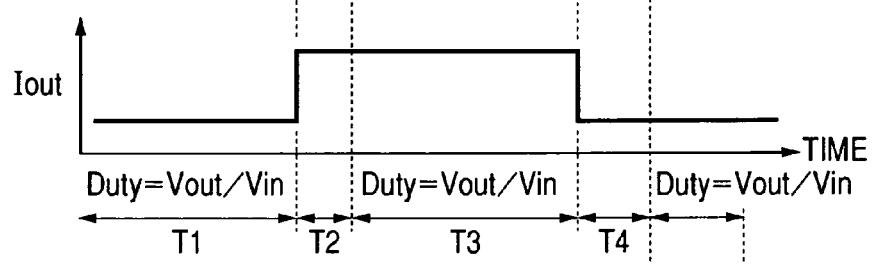
Figure 18D:
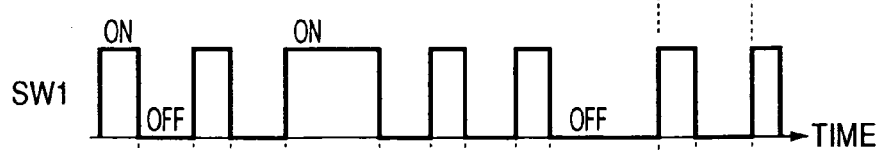
Figure 18E:
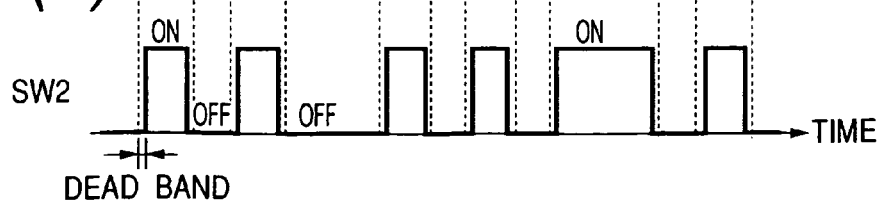

In the transient state (T2) where the output current Iout increases, potential change is transferred to the connection node n2 via the capacitor C1 depending on sudden drop of the output voltage Vout and when such potential Vn2 is rapidly decreased as illustrated in FIG. 18B, the period (OFF period of SW2) to turn ON the switch SW1 is extended as illustrated in FIG. 18D. Moreover, in the transition state (T4) where the output current Iout decreases, since the potential Vn2 of the connection node n2 rises depending on the sudden drop of the output voltage Vout, the period to turn OFF the switch SW1 is extended as illustrated in FIG. 18D.

Although not illustrated in FIG. 18A to FIG. 18E, when the transition state (T2) starts where the output current Iout increases while the coil current IL decreases, the period (ON period of SW2) to turn OFF the switch SW1 is shortened. Moreover, in the transition state (T4) where the output current Iout decreases while the coil current IL increases, the period to turn ON the switch SW1 is extended.

The conventional switching regulator of the hysteresis current mode control system feeds back change of output voltage to the hysteresis comparator via an error amplifier. However, in this embodiment, since change of output voltage is immediately transferred to the hysteresis comparator H-CMP via the capacitor C1, the response characteristic for change of output current Iout can be improved. In addition, since change of output is transferred to the comparator H-CMP having a higher input impedance via the capacitor C1, influence on the output voltage may also be reduced. Moreover, change of input voltage Vin is also transferred to the connection node n2 via the resistor R1 and it is then fed back to the hysteresis comparator. Accordingly, response of regulator for change of input voltage can also be improved.

The switching frequency fsw of the switching regulator of this embodiment is expressed by the following formula.

$$fsw = Vout(Vin - Vout)/Vin \cdot Vhys \cdot R1 \cdot C1 \quad (2)$$

From this formula, it is apparent that the switching frequency fsw of the regulator of this embodiment depends on the resistor R1 and capacitor C1, but not on the inductance of coil L1. The resistance element having small fabrication fluctuation in comparison with the coil may be obtained easily and moreover the capacitance element having the fabrication fluctuation which is similar to that of coil but the temperature characteristic which is smaller than that of coil may also be obtained easily. In addition, since there is no item of the inductance value of coil within the formula (2) indicating the switching frequency, it is no longer required to consider the particular problem of coil, namely the DC current superimposing characteristic in which the inductance value changes depending on the flowing current. Accordingly, variation of the switching frequency fsw can be reduced in comparison with the conventional switching regulator of the hysteresis current mode control system.

Moreover, the sense resistor which is connected in series to the coil is no longer required in the switching regulator of this embodiment. Even in this embodiment, the resistor is used but it is connected in series to the capacitor and there is no path for DC current. Therefore, power consumption can be reduced more than the conventional switching regulator of the hysteresis current mode control system. In addition, since the error amplifier is unnecessary, the response characteristic can be improved and it is no longer required to provide a phase compensation circuit. Accordingly, the scale of circuit can be as much reduced.

Figure 19:
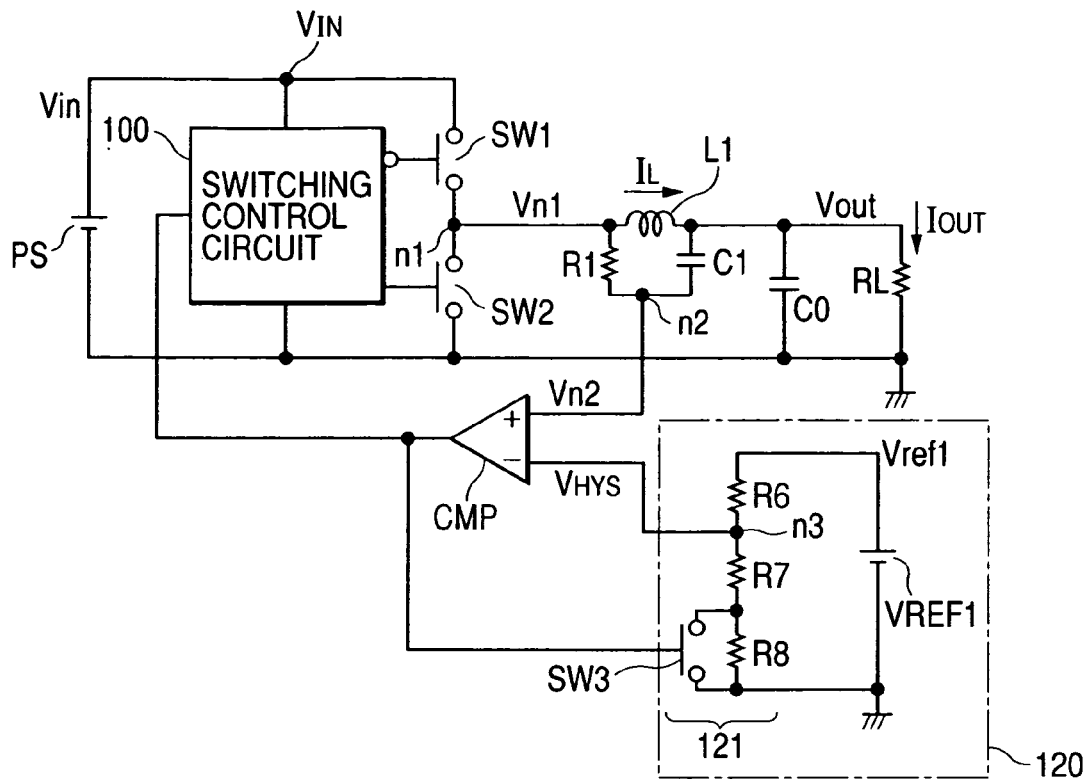
FIG. 19 is a structural diagram of circuit illustrating the second embodiment of the voltage step-down type switching regulator of the hysteresis current mode control system to which the present invention is applied.

FIG. 19 illustrates the second embodiment of the switching regulator of the present invention.

This embodiment uses an ordinary comparator CMP through replacement of the comparator H-CMP having the hysteresis characteristic used in the first embodiment, and switches the reference voltage VHYS to be inputted to this comparator. In more practical, the switching regulator of this embodiment is provided with the reference voltage source VREF1 and the reference voltage generating circuit 120 consisting of the serial resistors R6, R7, R8 for dividing the reference voltage Vref1 generated by the reference voltgage source VREF1 and the resistance dividing circuit 121 consisting of the switch SW3 provided in parallel to the resistor R8. In this structure, the potential of the connection node n3 of the resistor R6 and resistor R7 is impressed to the inverted input terminal of the comparator CMP as the reference voltage VHYS and the comparator CMP seems to have virtual hysteresis characteristic by changing the reference voltage VHYS through the switching operation of the switch SW3 with an output of the comparator CMP.

Figure 20:
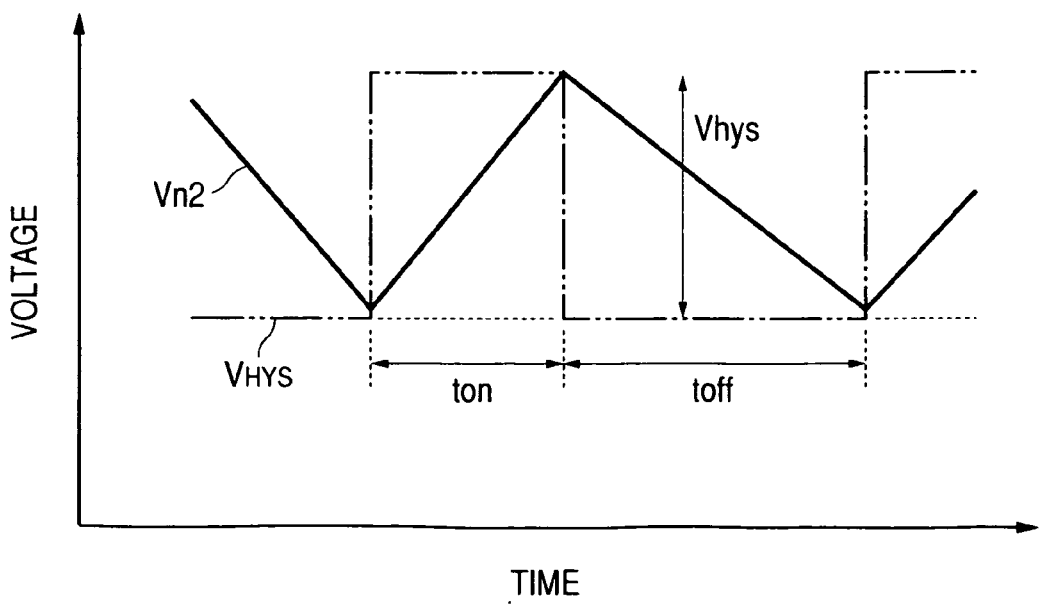
FIG. 20 is a timing chart illustrating changes of voltage inputted to a comparator in the switching regulator of the second embodiment.

FIG. 20 illustrates the relationship between the reference voltage VHYS applied to the inverted input terminal of the comparator CMP and the potential Vn2 of the node n2.

The circuit of FIG. 19 operates to turn ON the switch SW3 to lower the reference voltage VHYS when the potential Vn2 of node n2 is higher than the reference voltage VHYS and to turn OFF the switch SW3 to raise the reference voltage VHYS when the potential Vn2 of node n2 is lower than the reference voltage VHYS. In this embodiment, the regulator may be operated in the same manner as the regulator of the first embodiment when it is designed so that the voltage difference between the voltage obtained by turning ON the switch SW3 and dividing the reference voltage Vref1 with a ratio of the resistors R6 and R7 and the voltage obtained by turning OFF the switch SW3 and dividing the reference voltage Vref1 with the ratio R6/(R7+R8) of resistor T6 to the sum of the resistors R7 and R8 becomes equal to the hysteresis voltage Vhys of the comparator H-CMP in the first embodiment. In this embodiment, the switch SW3 is controlled with an output of the comparator CMP to switch the reference voltage VHYS. However, the similar operation can also be attained by providing an inverter to invert the potential of the connection node n1 of the switches SW1 and SW2 in order to turn ON and OFF the switch SW3 with an output of this inverter.

Figure 21:
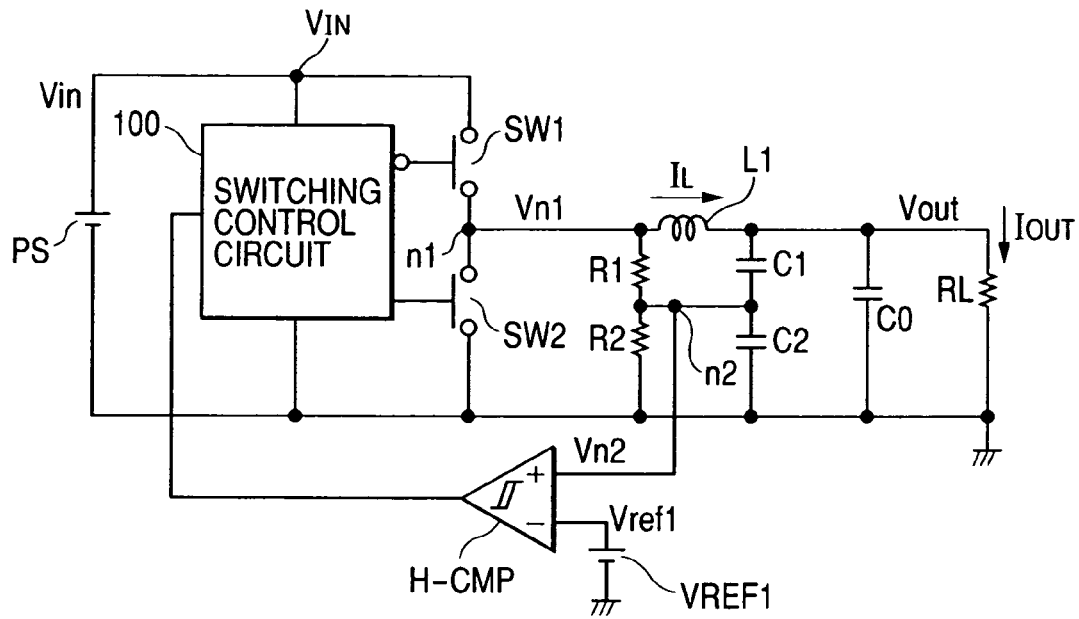
FIG. 21 is a structural diagram of circuit illustrating the third embodiment of the voltage step-down type switching regulator of the hysteresis current mode control system to which the present invention is applied.

FIG. 21 illustrates the third embodiment of the switching regulator of the present invention.

This embodiment connects a resistor R2 and a capacitor C2 between the connection node n2 of the resistor R1 and capacitor C1 and the grounding point in the circuit of the embodiment illustrated in FIG. 1. This third embodiment has the merit, in addition to the merit of the first embodiment, that an output voltage Vout can be adjusted with a ratio of the resistor R1 and the resistor R2. Namely, in this embodiment, the output voltage Vout is given by the formula, Vout=R2/(R1+R2). Therefore, the output voltage Vout can be set freely without change of the reference voltage Vref1 by adjusting the ratio of the resistor R1 and resistor R2.

Here, the capacitor C2 is provided to prevent deterioration of transient response characteristic caused by generation of delay and lead of phase because the resistor R2 is provided. Delay and lead of phase can be reduced by setting the resistance value and capacitance value to attain the relationship of R1·C1=R2·C2.

Figure 22:
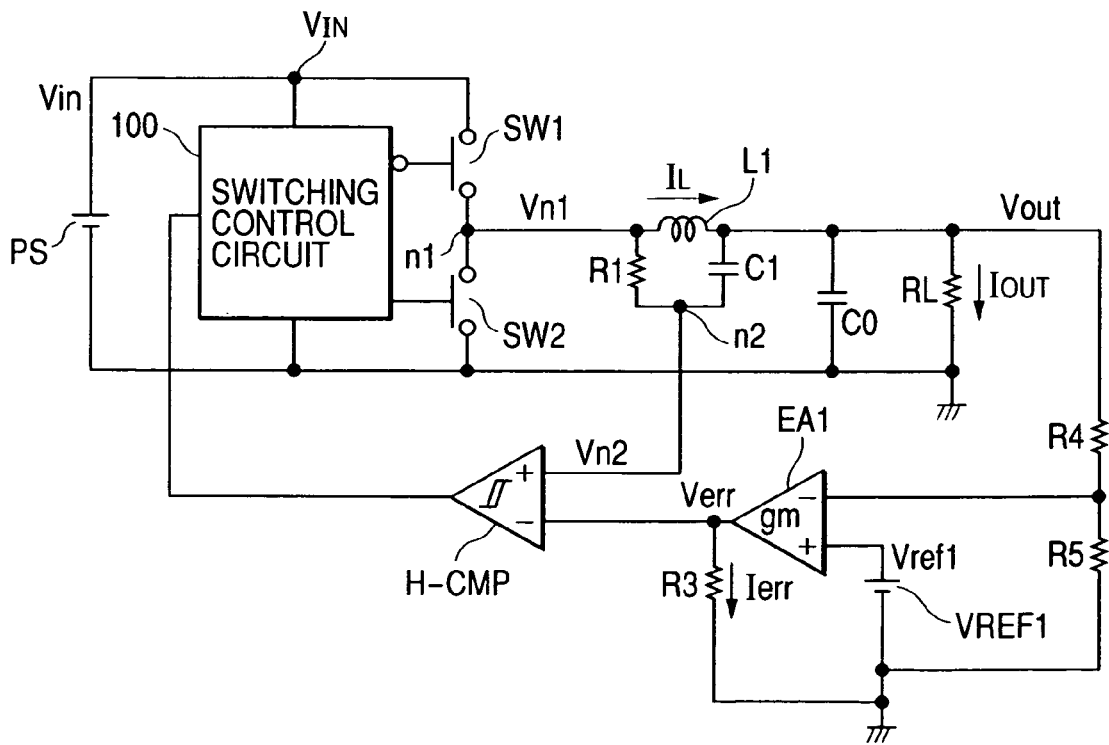
FIG. 22 is a structural diagram of circuit illustrating the fourth embodiment of the voltage step-down type switching regulator of the hysteresis current mode control system to which the present invention is applied.

FIG. 22 illustrates the fourth embodiment of the switching regulator of the present invention.

This embodiment is provided, in the circuit of the embodiment of FIG. 16, with resistors R4 and R5 for dividing the output voltage Vout, the error amplifier EA1 consisting of the trans-conductance type amplifier (gm amplifier) for detecting voltage difference between the divided voltage and reference voltage Vref1 and the resistor R3 connected between the output terminal of error amplifier EA1 and the grounding point. The output terminal of error amplifier EA1 is connected to the input terminal in the reference side of comparator H-CMP. According to this embodiment, since the sense resistor connected in series to the coil L1 is not provided, it is possible to obtain the merit that power consumption can be reduced like the first embodiment in comparison with the conventional circuit.

Moreover, this embodiment provides the merit that the output voltage Vout can be set without change of the reference voltage Vref1 due to the resistance ratio of the resistors R4 and R5, although response to change of output current is delayed in comparison with the first embodiment as much as existence of the error amplifier EA1 and resistor R3. In this embodiment, the output voltage Vout is given by the formula Vout=R5/(R4+R5)·Vref1.

In this embodiment, the resistor R3 is provided between the output terminal of error amplifier EA1 and the grounding point, but this resistor R3 can also be connected between the output terminal of regulator, namely one terminal of coil L1 and the output terminal of error amplifier EA1. In this case, the similar effect can also be obtained. The resistors R4, R5 can also be provided within the IC but a user can also be set freely the output voltage by providing these resistors as the external elements. When the capacitor C1 and resistor R1 parallel to the coil L1 are provided as the external elements as illustrated in FIG. 16 and FIG. 17, the number of external terminals (pins) of the IC is not increased conveniently even when the resistors R4 and R5 are formed as the external elements.

Figure 23:
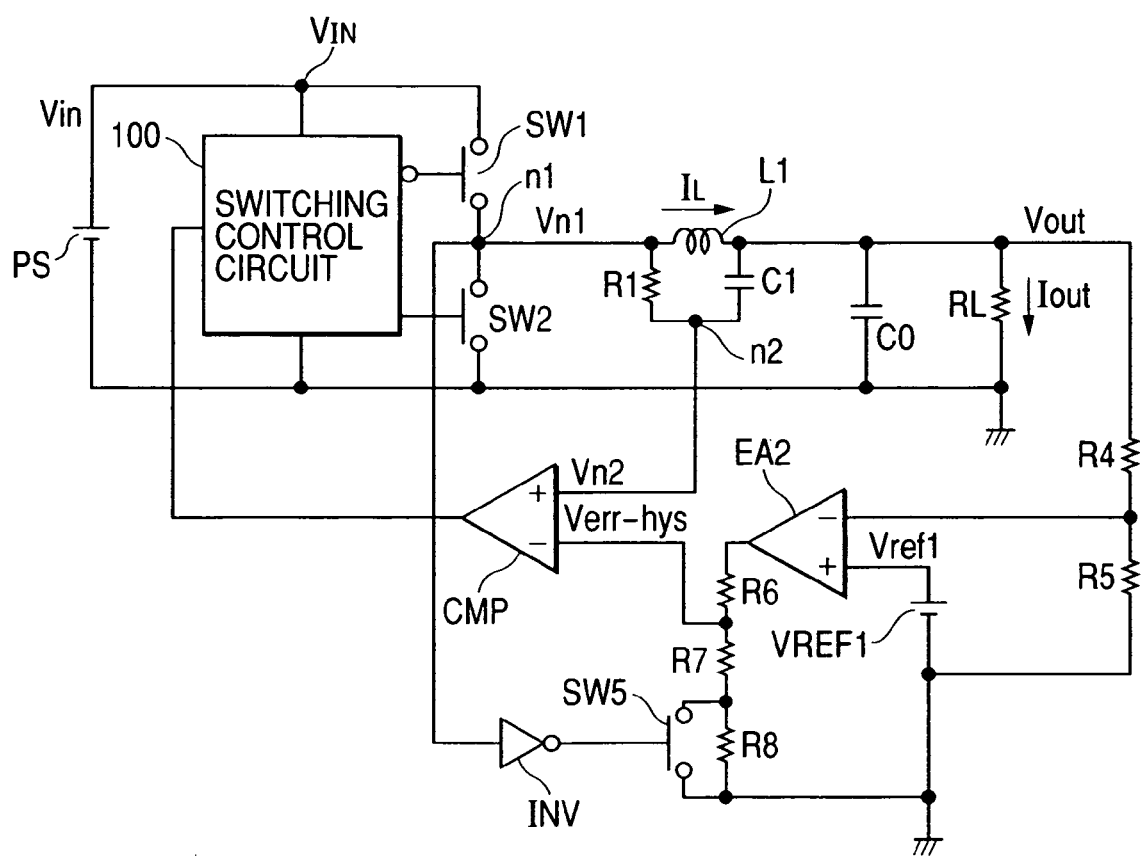
FIG. 23 is a structural diagram of circuit illustrating the fifth embodiment of the voltage step-down type switching regulator of the hysteresis current mode control system to which the present invention is applied.

FIG. 23 illustrates the fifth embodiment of the switching regulator of the present invention.

This embodiment can be realized in such a form as combining the second embodiment of FIG. 19 and the fourth embodiment of FIG. 22. Namely, in the embodiment of FIG. 22, the hysteresis comparator H-CMP is replaced with an ordinary comparator CMP, the serially connected resistors R6, R7, R8 are connected between the output terminal of error amplifier EA and the grounding point, the switch SW3 is provided parallel to the resistor R8 and the comparison voltage applied to the inverted input terminal of the comparator CMP is switched. Thereby, the comparator CMP is capable of showing the hysteresis characteristic.

In this embodiment, the switch SW3 is configured to be controlled for ON and OFF states with the signal obtained by inverting the potential of the connection node n1 of the main switch SW1 and synchronous switch SW2 with the inverter INV. This structure is described as an example of modification in the embodiment of FIG. 19 and the switch SW3 can also be controlled in direct, like the embodiment of FIG. 19, with an output of the comparator CMP. Accordingly, the inverter INV may be eliminated. Moreover, in this embodiment, as the error amplifier EA, a voltage input–voltage output type differential amplifier may be used in place of the gm amplifier.

Figure 24:
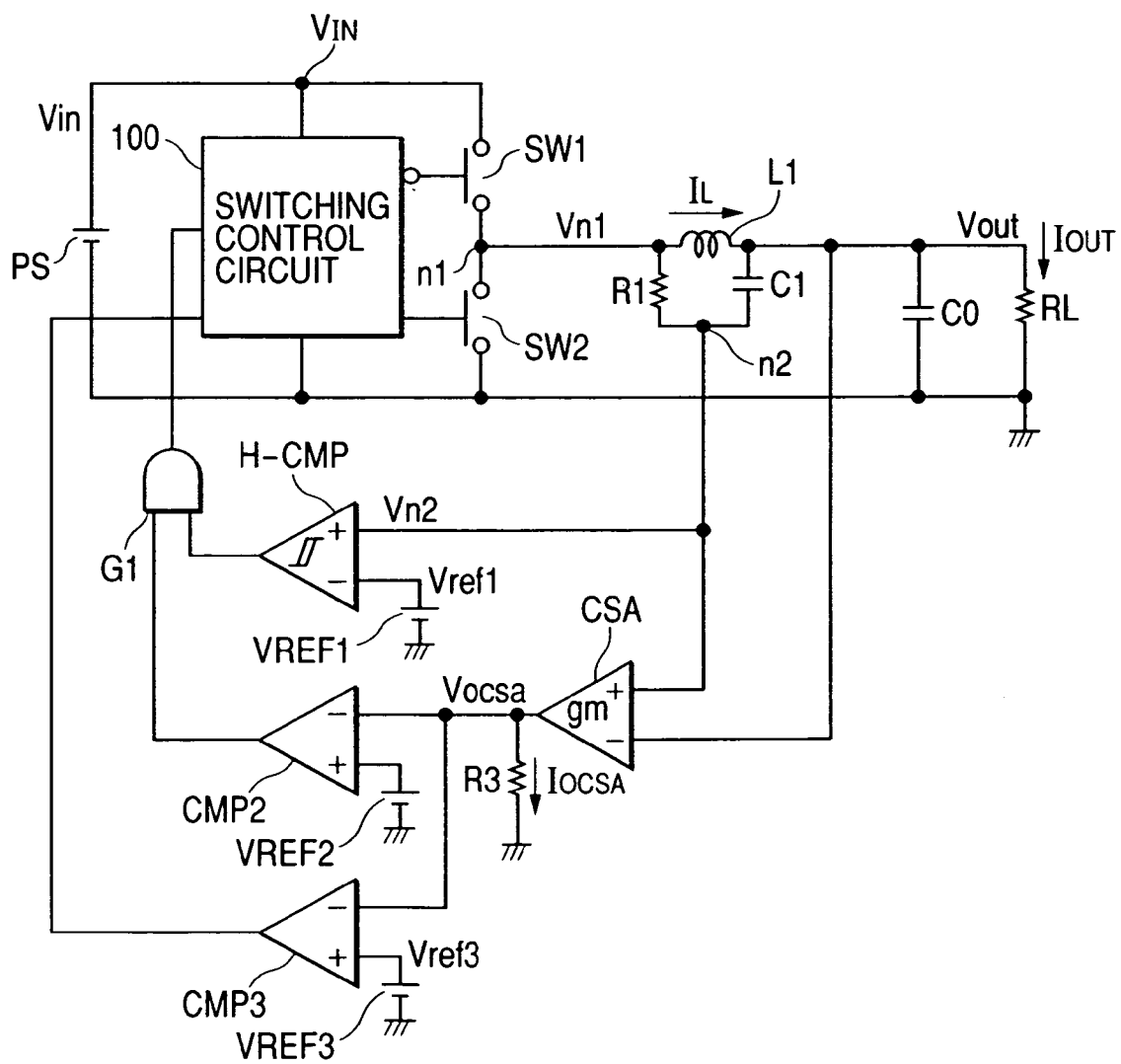
FIG. 24 is a structural diagram of circuit illustrating the sixth embodiment of the voltage step-down type switching regulator of the hysteresis current mode control system to which the present invention is applied.

FIG. 24 illustrates the sixth embodiment of the switching regulator of the present invention.

This embodiment is provided with, in the first embodiment of FIG. 16, with the current sense amplifier CSA consisting of gm amplifier which inputs the output voltage Vout and the potential Vn2 of the node n2, the resistor R3 for converting the output current Iocsa of the current sense amplifier to voltage, the first comparator CMP2 for comparing the converted voltage with the reference voltage Vref2, the second comparator CMP3 for comparing the voltage Vocsa converted by the resistor R3 with the reference voltage Vref3 (<Vref2), and the AND gate G1 for obtaining logical sum of the output of comparator CMP2 and the output of hysteresis comparator H-CMP. Accordingly, the condition where an over current flows and the condition of light load can be detected respectively to change the control by the switching control circuit 100 depending on the condition of regulator.

In the circuit of this embodiment, when the output current Iout increases, difference between the output voltage Vout and potential Vn2 of the node n2 becomes large. Thereby, the output current Iocsa of the current sense amplifier CSA increases and the voltage Vocsa also rises. When the voltage Vocsa becomes higher than the reference voltage Vref2, an output of the comparator CMP2 changes to the low level and thereby the output of AND gate G1 is fixed to the low level. Accordingly, the switching control circuit 100 turns OFF the main switch SW1 and turns ON the synchronous switch SW2 to reduce the current flowing into the coil. As a result, the output current Iout can be limited (over current protection) not to exceed a certain level.

Moreover, when the output current Iout is reduced, difference between the output voltage Vout and the potential Vn2 of the node n2 is also reduced and thereby the output current Iocsa of the current sense amplifier CSA is reduced to reduce the voltage Vocsa. When the voltage Vossa becomes lower than the reference voltage Vref3, an output of the comparator CMP3 changes to the high level. In this timing, the switching control circuit 100 simultaneously turns OFF the main switch SW1 and synchronous switch SW2 to reduce the coil current. Thereby, the power efficiency can be improved under the light load condition where only the output current Iout under the predetermined value flows.

Figure 25:
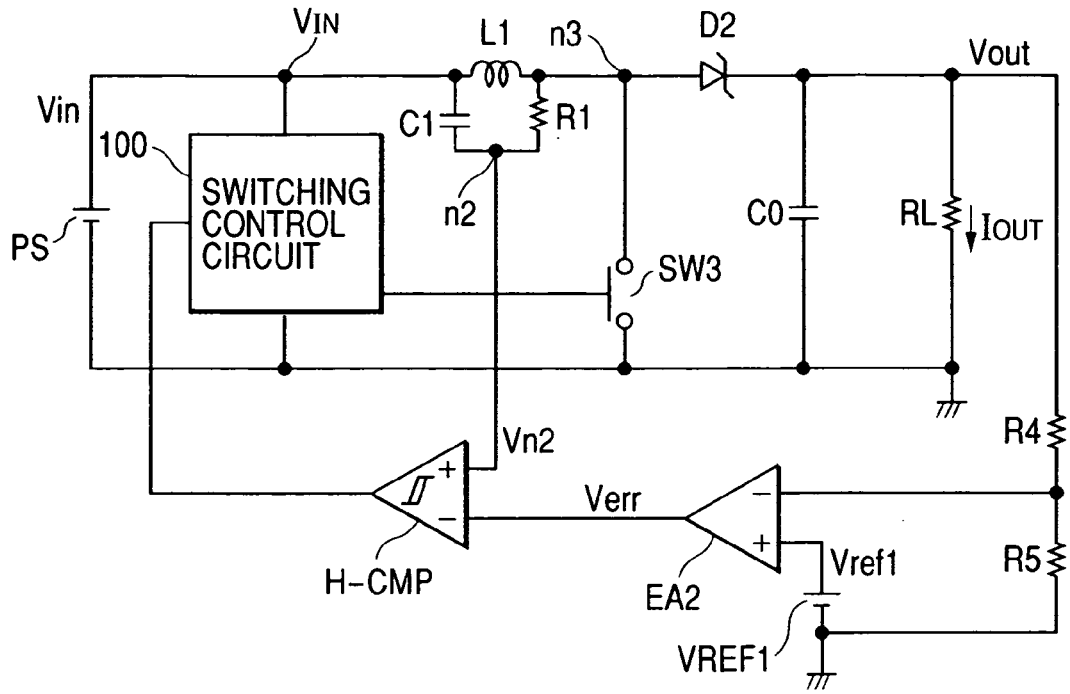
FIG. 25 is a structural diagram of circuit illustrating an embodiment of the voltage step-up type switching regulator of the hysteresis current mode control system to which the present invention is applied.

FIG. 25 illustrates an embodiment where the present invention is applied to the voltage step-up type switching regulator of the hysteresis current mode control system.

In the voltage step-up type switching regulator of this embodiment, the synchronous switch (SW2) is replaced with a diode D2 for preventing inverse current which is provided in series to the coil L1. Moreover, the main switch SW3 is provided between the connection node n3 of the coil L1 and diode D2 and the grounding point.

In the conventional switching regulator of the hysteresis current mode control system (U.S. Pat. No. 5,825,165), a resistor (216) for sensing current is provided in series with the coil L1, but in the embodiment of FIG. 25 of the present invention, the serially connected capacitor C1 and resistor R1 are connected in parallel to the coil L1 and the potential Vn2 of the connection node n2 of the capacitor C1 and resistor R1 is inputted to the non-inverted input terminal of the hysteresis comparator H-CMP. An output Verr of the error amplifier EA2 is inputted to the inverted input terminal of the hysteresis comprator H-CMP in order to compare the voltage obtained by dividing the output voltage Vout with the resistors R4 and R5 with the reference voltage Vref1. Even in this embodiment, since the resistor for sending current is not provided in series to the coil L1, there is provided the merit that power consumption may be reduced in comparison with the conventional regulator.

Here, it is also possible that a synchronous switch which is complementarily turned ON and OFF for the main switch SW3 is provided in place of the diode D2 and the reference voltage Vref1 is impressed in direct to the hysteresis comparator H-CMP by eliminating the error amplifier EA2 and resistors R4, R5 for adjusting the output voltage.

Moreover, like the embodiment of FIG. 23, it is also possible to use the ordinary comparator in place of the hysteresis comparator H-CMP and switch the reference voltage to give the hysteresis characteristic to such comparator. Furthermore, the capacitor C1 and resistor R1 which are connected in series are provided in parallel to the diode D2 in place of connection of the serially connected capacitor C1 and resistor R1 in parallel to the coil L1. However, in this case, it is recommended to connect the capacitor C1 in the side of output terminal providing the voltage changing to a large extent and to connect the resistor R1 in the side of anode terminal of the diode D2.

Figure 26:
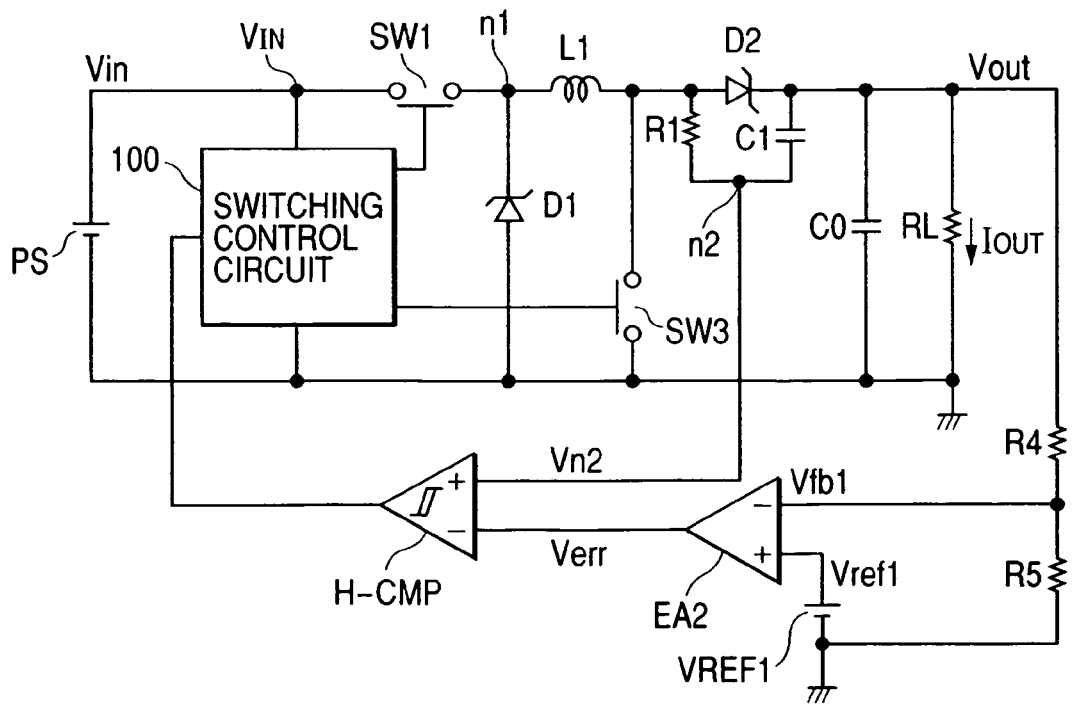
FIG. 26 is a structural diagram of circuit illustrating a voltage step-up and step-down type switching regulator of the hysteresis current mode control system to which the present invention applied.

FIG. 26 illustrates an embodiment where the present invention is applied to the voltage step-up and step-down type switching regulator which can step up and step down the voltage.

This voltage step-up and step-down type switching regulator of this embodiment has the circuit configuration that the switch SW1 is provided in series to the coil L1 in the voltage step-up type switching regulator of FIG. 25 and moreover a backward diode D1 is added between the connection node n1 of the switch SW1 and coil L1 and the grounding point. The switches SW1 and SW3 may be turned ON and OFF in the same timing or may be turned ON and OFF after a certain delay time.

In this embodiment, the current sensing resistor in series to the coil L1 is eliminated as in the case of the embodiment of FIG. 25, the coil L1 is replaced with the serially connected capacitor C1 and resistor R1 in parallel to the diode D2, and the potential of the connection node n2 of the capacitor C1 and resistor R1 is inputted to the non-inverted input terminal of the hysteresis comparator H-CMP. This embodiment also provides the merit that power consumption is small in comparison with the conventional regulator because a series resistor for sensing the current is not provided.

Here, it is also possible that the diodes D1, D2 may be replaced with a synchronous switch which is complementarily turned ON and OFF for the main switches SW1, SW3 and that the error amplifier EA1 and resistors R4, R5 which can adjust the output voltage are eliminated and the reference voltage Vref1 is applied in direct to the hysteresis comparator H-CMP. Moreover, like the embodiment of FIG. 23, the hysteresis comparator H-CMP is replaced with the ordinary comparator and the reference voltage thereof is switched to provide the hysteresis characteristic.

Furthermore, the serially connected capacitor C1 and resistor R1 may be connected in parallel to the coil L1 like the embodiment of FIG. 35, in place of connecting the serially connected capacitor C1 and resistor R1 in parallel to the diode D2. In this case, the capacitor C1 and resistor R1 may be connected in the relationship of FIG. 25 and the capacitor C1 may be connected in the side of connection node n1 with the switch SW1, while the resistor R1 may be connected in the side of anode terminal of the diode D2.

Figure 27:
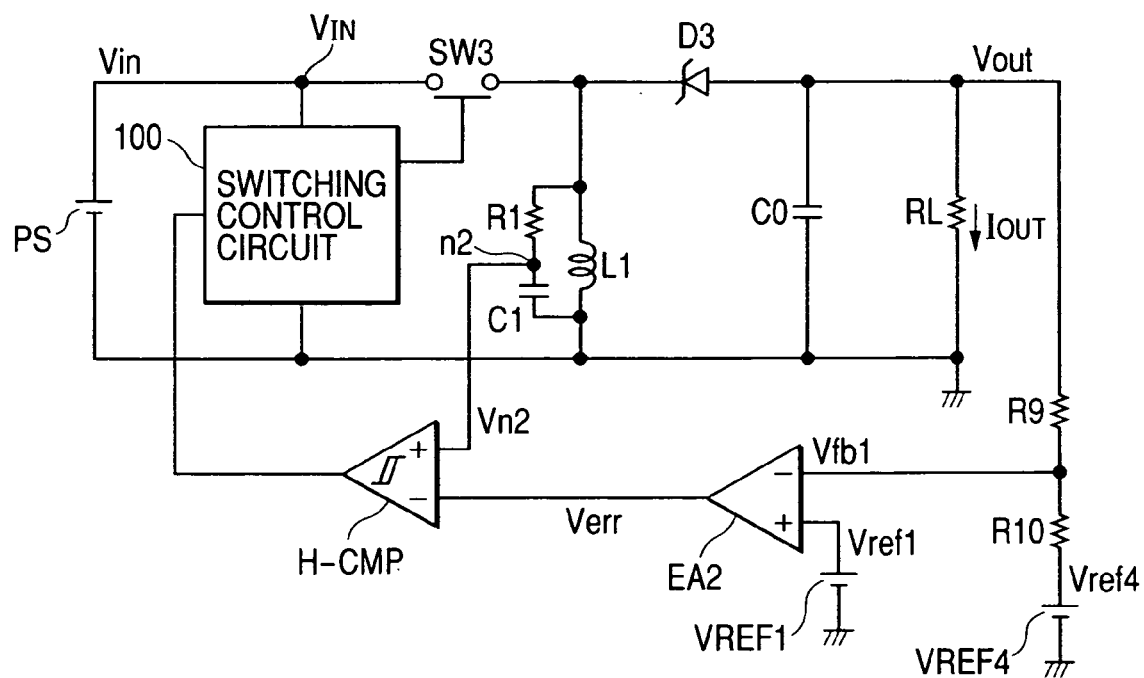
FIG. 27 is a structural diagram of circuit illustrating an embodiment of switching regulator of the hysteresis current mode control system to generate a negative voltage to which the present invention is applied.

FIG. 27 illustrates an embodiment where the present invention is applied to the switching regulator of the hysteresis current mode control system which generates negative voltage.

The negative voltage generating switching regulator of this embodiment has a structure that allocation of coil L1 and switch SW3 is inverted in the voltage step-up type switching regulator of FIG. 25. Moreover, the diode D3 for preventing backward current is inverted in allocation from the diode D2 of FIG. 25. In this embodiment, the resistor for sensing current in series to the coil L1 is not provided as in the case of the embodiment of FIG. 25, the serially connected capacitor C1 and resistor R1 are connected in parallel to the coil L1, and the potential of the connection node n2 of the capacitor C1 and resistor R1 is inputted to the non-inverted input terminal of the hysteresis comparator H-CMP. Even in this embodiment, since the serial resistor for sensing current is not provided, there is provided a merit that power consumption can be reduced in comparison with the conventional switching regulator.

Here, it is also possible that the diode D3 is replaced with the synchronous switch which is complementarily turned ON and OFF to the main switch SW3 and the error amplifier EA2 and resistors R4, R5 which can adjust the output voltage are eliminated to apply in direct the reference voltage Vref1 to the hysteresis comparator H-CMP. Moreover, like the embodiment of FIG. 23, the hysteresis comparator H-CMP is replaced with the ordinary comparator to switch the reference voltage thereof in order to provide the hysteresis characteristic.

Figure 28:
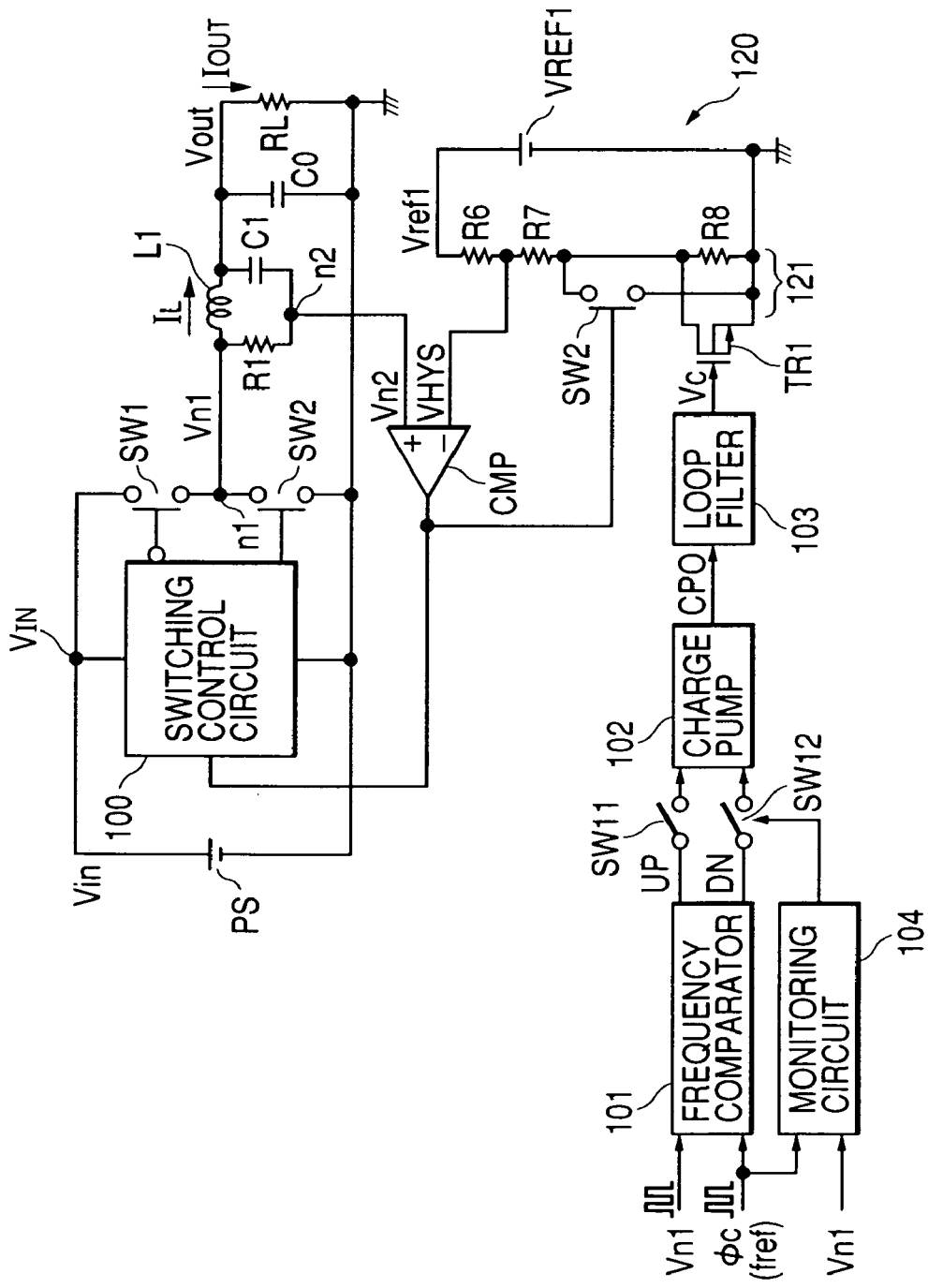
FIG. 28 is a structural diagram of circuit illustrating an embodiment of the circuit to generate the reference voltage having the hysteresis characteristic of the switching regulator of the second embodiment of the present invention.

FIG. 28 illustrates an embodiment of the second invention of the present specification.

In this embodiment, the second invention is applied to the switching regulator where the reference voltage VHYS of two stages are generated as the voltage to be supplied to the comparator CMP like the embodiment of FIG. 19 in order to give the hysteresis characteristic. In more practical, the MOSFET TR1 is provided in parallel to the resistor R8 of the resistance dividing circuit 121 which generates the reference voltage VHYS of two stages applied to the comparator CMP by diving the reference voltage Vref1 of the reference power source VREF1 with the resistors R6, R7, R8 and the ON resistance of the MOSFET TR1 is varied with the circuit having the structure similar to the PLL (Phase-Locked Loop) in order to compensate for the reference voltage VHYS generated with the resistance dividing circuit 121.

In the circuits of FIG. 16 and FIG. 19, it is apparent from the formula (2) that the switching frequency fsw varies when the input voltage Vin and output voltage Vout are changed. In addition, when the switching frequency fsw of regulator varies and it is matched with the communication frequency in the electronic device having the communication function and audio reproducing function, there is probability for generation of beat noise in the audible frequency band due to the electromagnetic interference. Therefore, in this embodiment, generation of noise is controlled by compensating for the reference voltage VHYS so that the switching frequency fsw of regulator is always matched with the frequency fref of the reference clock φc even when the input voltage Vin and output voltage Vout are changed.

In more practical, the switching regulator of this embodiment comprises the frequency comparator 101 which detects difference between the frequency of the potential Vn1 (the control signal of switch SW1 is also allowable) of the connection node n1 of the switches SW1 and SW2 which changes in the same period as the switching frequency fsw of the regulator and the reference clock φc of the system and outputs the signals UP, DN depending on the frequency difference, the charge pump circuit 102 which is operated with the output signals UP, DN of the frequency comparator 101, and the loop filter 103 for generating the control voltage Vc with inclusion of the capacitor which is charged and discharged with the charge pump circuit 102. Accordingly, the voltage Vc of the loop filter 103 is applied to the gate terminal of the MOSFET TR1. Moreover, the switches SW11, SW12 are provided between the loop filter 103 and charge pump circuit 102. The PLL circuit generally uses the phase comparator and both phase comparator and frequency comparator are sometimes provided in order to assure quick pull-in of the frequency. In the circuit configuration of this embodiment, only the frequency comparator is used.

The circuit of this embodiment is operated to increase, when the potential Vn1 of the node n1, namely the switching frequency of regulator becomes relatively high, the voltage Vc of the loop filter 103 to reduce the ON resistance of the MOSFET TR1 and thereby to reduce the combined resistance with the resistor R8 to lower the reference voltage VHYS. Moreover, when the changing frequency of the potential Vn1 of the node n1 becomes relatively lower, the voltage Vc of the loop filter 103 is also lowered to increase the ON resistance of the MOSFET TR1. Thereby, the combined resistance with the resistor R8 becomes large to increase the reference voltage VHYS.

Figure 29:
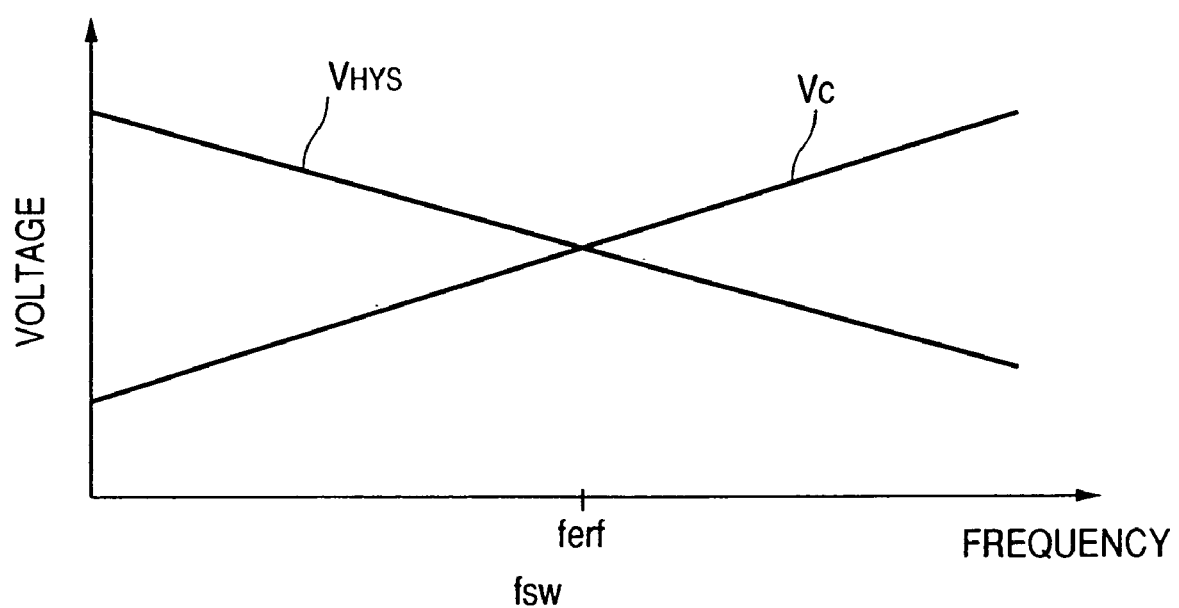
FIG. 29 is a graph illustrating the relationship between the switching frequency fsw in the switching regulator of the second invention of the present invention and the reference voltage VHYS applied to the comparator.

FIG. 29 illustrates the relationship among the switching frequency fsw of regulator and voltage Vc of loop filter 103 and the reference voltage VHYS. As in the case of FIG. 29, the switching frequency fsw of the regulator is controlled to be always matched with or set to the value near the frequency fref of the reference clock φc of the system by compensating for the reference voltage VHYS to be inversely proportional to the voltage Vc which increases proportionally to the switching frequency fsw. As a result, it can be prevented that beat noise is generated in the audible frequency range with the switching noise generated by the regulator.

Here, when the reference voltage VHYS is changed by controlling the ON resistance of the MOSFET TR1 through operation of the PLL circuit described above, since the period where the potential Vn1 of the node n1 varies is extended or shortened with the control of ON/OFF period of the switches SW1, SW2 extended when the output current Iout is varied (transient periods T2, T4) as described with reference to the timing chart of FIGS. 18A to 18E, an output of the frequency comparator 101 is temporarily interfered. Therefore, in this embodiment, the monitoring circuit 104 is provided to monitor the potential Vn1 (control signal of switch SW1 is also allowable) of the connection node n1 of the switches SW1 and SW2 and the switches SW11, SW12 are quickly controlled, when the ON period of the switch SW1 is continued for the predetermined period of longer, to become OFF so that an output of the frequency comparator 101 is not supplied to the charge pump 102.

The present invention has been described above practically with reference to the preferred embodiment, but the present invention is not limited to above embodiments and allows various changes or modifications within the scope not departing from the claims. For example, in above embodiments, the synchronous switch SW2 is provided in series to the main switch SW1 in order to operate to reduce the current to the coil when the switch SW1 is turned OFF. But, this synchronous switch SW2 may be replaced with a diode. Moreover, in the embodiment of FIG. 28, the monitoring circuit 104 monitors the potential Vn1 of the node n1 in view of suspending compensation for the reference voltage VHYS during the period where the output current varies but it is also possible to form the structure that compensating operation for the reference voltage VHYS is suspended by monitoring the potential of the other area such as the node n2.

The switching regulator invented as the present invention has been described above as the example where it is independently used as the power supply device of an electronic device in the application field considered as the background of the present invention, but the switching regulator of the present invention can also be used widely into the switching regulator and DC—DC converter in the semiconductor integrated circuit device.

The effects of the typical invention disclosed in the present invention are as follows.

Namely, according to the present invention, there is provided a switching power supply device of the hysteresis current mode control system which assures excellent response characteristic for change of output current and lower power consumption. Thereby, it is possible to realize a portable electronic device which can reduce consumption of battery in the power supply device to be driven with the battery and can ensure long-term operation only with single battery or with single charge thereof.

Moreover, according to the present invention, it is possible to realize the switching power supply device of hysteresis current mode control system which can generate high precision voltage where the switching frequency does not depend on coil inductance and amplitude of coil current. In addition, a switching power supply device can also be realized wherein generation of noise which may give adverse effect on the system can be suppressed because the switching frequency does not vary.

What is claimed is:

1. A switching power supply device comprising:
a first power supply terminal;
a second power supply terminal;
a switching element having a control terminal, a source terminal and a drain terminal, one of the source and drain terminals being coupled to the first power supply terminal;
an inductor having a first terminal coupled to the other of the source and drain terminals of the switching element and a second terminal;
a first capacitor having a first terminal coupled to the second terminal of the inductor and to be coupled to a load element and a second terminal coupled to the second power supply terminal;
a first resistor having a first terminal coupled to the other of the source and drain terminals of the switching element and a second terminal;
a second capacitor having a first terminal coupled to the second terminal of the first resistor and a second terminal coupled to the second terminal of the inductor; and
a hysteresis comparator having an input terminal coupled to the second terminal of the first resistor and an output terminal coupled to the control terminal of the switching element, the hysteresis comparator comparing a voltage received from the input terminal thereof with a first and a second threshold voltage relating to a hysteresis characteristic thereof and providing a discrimination result to the control terminal of the switching element.

2. The switching power supply device according to claim 1, wherein the hysteresis comparator outputs the discrimination result for the control terminal so as to control the voltage between the first threshold voltage and the second threshold voltage.

3. A power supply device, comprising:
a power supply terminal;
a ground terminal;
a P-channel MOSFET which has a control terminal, a source terminal coupled to the power supply terminal, and a drain terminal;

an N-channel MOSFET which has a control terminal, a source terminal coupled to the ground terminal, and a drain terminal coupled to the drain terminal of the P-channel MOSFET;

an inductor having a first terminal coupled to the drain terminal of the P-channel MOSFET and a second terminal;

a first capacitor having a first terminal coupled to the second terminal of the inductor and to be coupled to a load element and a second terminal coupled to the ground terminal;

a first resistor having a first terminal coupled to the drain terminal of the P-channel MOSFET and a second terminal;

a second capacitor having a first terminal coupled to the second terminal of the first resistor and a second terminal coupled to the second terminal of the inductor;

a second resistor having a first terminal coupled to a second terminal of the first resistor and a second terminal;

a hysteresis comparator having a first input terminal coupled to the second terminal of the first resistor and an output terminal, the hysteresis comparator comparing a first voltage received from the first input terminal thereof with a first and a second threshold voltage; and a switching control circuit which receives a discrimination result from the output terminal of the hysteresis comparator and controls the control terminals of the P-channel and the N-channel MOSFET based on the discrimination result.

4. The power supply device according to claim 3, further comprising:

a third resistor having a first terminal coupled to the first terminal of the first capacitor and a second terminal;

a fourth resistor having a first terminal coupled to the second terminal of the third resistor and a second terminal coupled to the ground terminal; and an error amp having a first input terminal which receives a second voltage from the second terminal of the third resistor, a second input terminal which receives a first reference voltage and an output terminal outputting an output signal to a second input terminal of the hysteresis comparator, wherein the second terminal of the second resistor is coupled to the ground terminal.

5. The power supply device according to claim 3, wherein a predetermined voltage is input to a second input terminal of the hysteresis comparator.

6. The power supply device according to claim 5, wherein the second terminal of the second resistor is coupled to the ground terminal.

7. The power supply device according to claim 3, wherein the hysteresis comparator outputs the discrimination result so as to control the first voltage between the first threshold voltage and the second threshold voltage.

8. A power supply device, comprising:

a power supply terminal;

a ground terminal;

a first N-channel MOSFET which has a control terminal, a source terminal, and a drain terminal which is coupled to the power supply terminal;

a second N-channel MOSFET which has a control terminal, a source terminal coupled to the ground terminal, and a drain terminal which is coupled to the source terminal of the first N-channel MOSFET;

an inductor having a first terminal coupled to the source terminal of the first N-channel MOSFET and a second terminal;

a first capacitor having a first terminal coupled to the second terminal of the inductor and to be coupled to a load element and a second terminal coupled to the ground terminal;

a first resistor having a first terminal coupled to the source terminal of the first N-channel MOSFET and a second terminal;

a second capacitor having a first terminal coupled to the second terminal of the first resistor and a second terminal coupled to the second terminal of the inductor;

a second resistor having a first terminal coupled to the second terminal of the first resistor and a second terminal;

a hysteresis comparator having a first input terminal coupled to the second terminal of the first resistor and an output terminal, the hysteresis comparator comparing a first voltage received from the first input terminal thereof with a first and a second threshold voltage; and a switching control circuit which receives a discrimination result from the output terminal of the hysteresis comparator and controls the control terminals of the MOSFETs based on the discrimination result.

9. The power supply device according to claim 8, further comprising:

a third resistor having a first terminal coupled to the first terminal of the first capacitor and a second terminal;

a fourth resistor having a first terminal coupled to the second terminal of the third resistor and a second terminal coupled to the ground terminal; and an error amp having a first input terminal which receives a second voltage from the second terminal of the third resistor, a second input terminal which receives a first reference voltage and an output terminal outputting an output signal to a second input terminal of the hysteresis comparator, wherein the second terminal of the second resistor is coupled to the ground terminal.

10. The power supply device according to claim 8, wherein a predetermined voltage is input to a second terminal of the hysteresis comparator.

11. The power supply device according to claim 8, wherein the second terminal of the second resistor is coupled to the ground terminal.

12. The semiconductor integrated circuit for the power supply device according to claim 8, wherein the hysteresis comparator outputs the discrimination result so as to control the first voltage between the first threshold voltage and the second threshold voltage.

* * * * *